Figure 1:
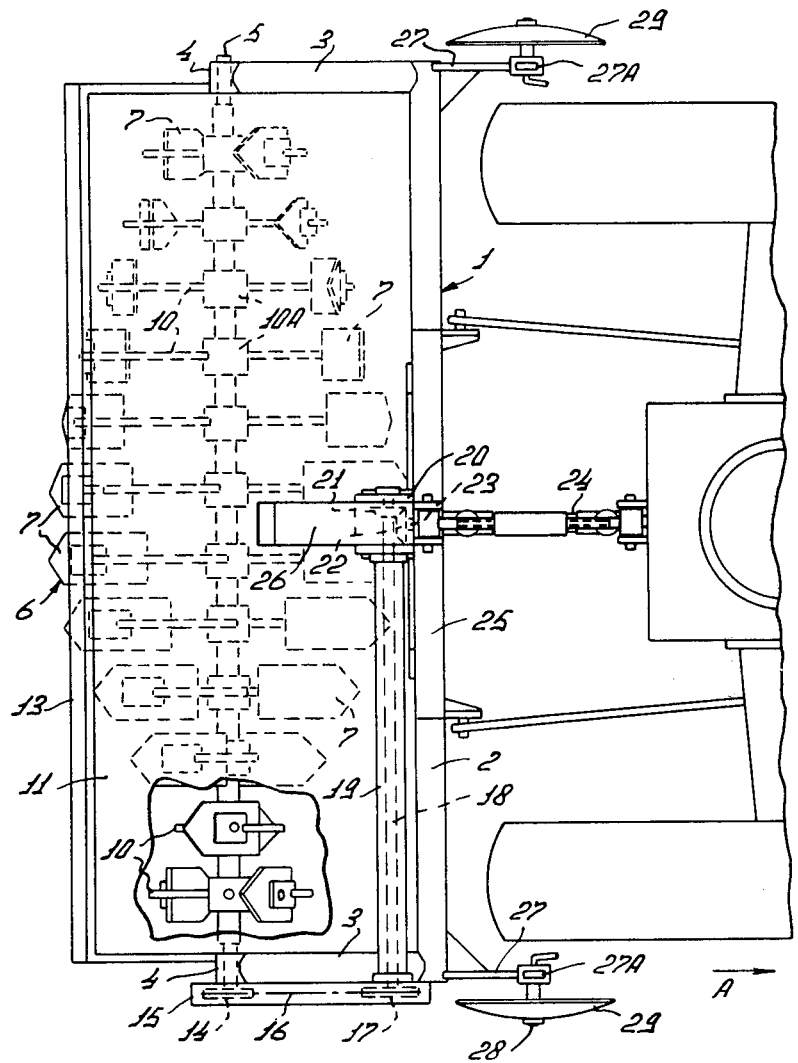

United States Patent [19]
van der Lely

[11] 3,963,078
[45] June 15, 1976

[54] SOIL CULTIVATING IMPLEMENTS
[76] Inventor: Cornelis van der Lely, 7, Bruschenrain, Zug, Switzerland
[22] Filed: Nov. 19, 1973
[21] Appl. No.: 417,366

[30] Foreign Application Priority Data
Nov. 22, 1972 Netherlands.......................... 7215773
Mar. 6, 1973 Netherlands.......................... 7303081

[52] U.S. Cl................................. 172/119; 172/123
[51] Int. Cl.²............................................. A01B 33/00
[58] Field of Search............ 172/60, 118, 119, 123, 172/540

[56] References Cited
UNITED STATES PATENTS

| | | | |
|---|---|---|---|
| 19,652 | 3/1858 | Roach.................................. | 172/19 |
| 256,542 | 4/1882 | Bostwick............................ | 172/119 |
| 1,225,547 | 5/1917 | Willson............................ | 172/119 X |
| 2,117,065 | 5/1938 | Lassas............................ | 172/119 X |
| 3,737,199 | 6/1973 | Stephenson..................... | 172/123 X |

FOREIGN PATENTS OR APPLICATIONS

| | | | |
|---|---|---|---|
| 490,125 | 4/1919 | France................................. | 172/40 |

*Primary Examiner*—Stephen C. Pellegrino
*Attorney, Agent, or Firm*—Mason, Mason & Albright

[57] ABSTRACT

A soil cultivating implement, such as a rotary plow has soil working members mounted to revolve about an axis that extends transverse to the direction of travel. The soil working members can be tines or blades that are positioned to enter the soil in unison, lift sliced portions of soil and deposit same on the ground to the rear of the plow. The soil working members are mounted in offset relationship at locations about the axis of rotation to minimize "drag and snatch." The soil working members can be turned in addition to being revolved about the axis of rotation as a part of a rotor and more than one row of soil working members can be mounted on the implement. Scrapers, stationary or movable, can be positioned to cooperate with the soil working members to shed the soil from these members.

16 Claims, 28 Drawing Figures

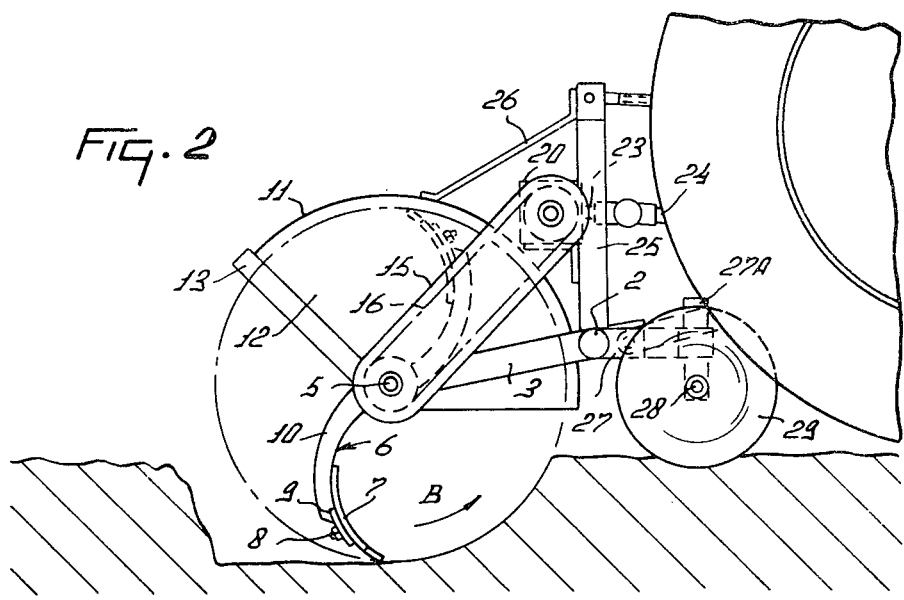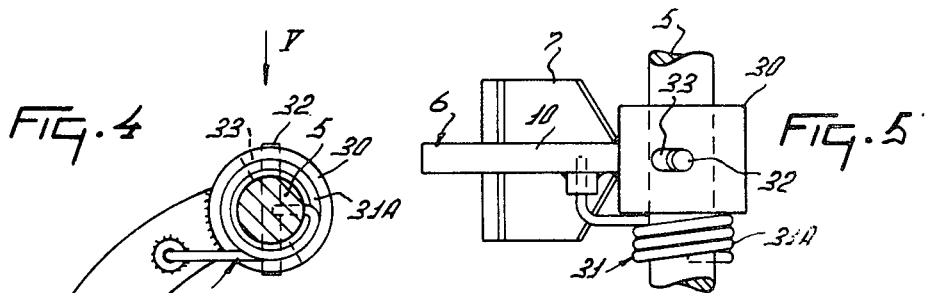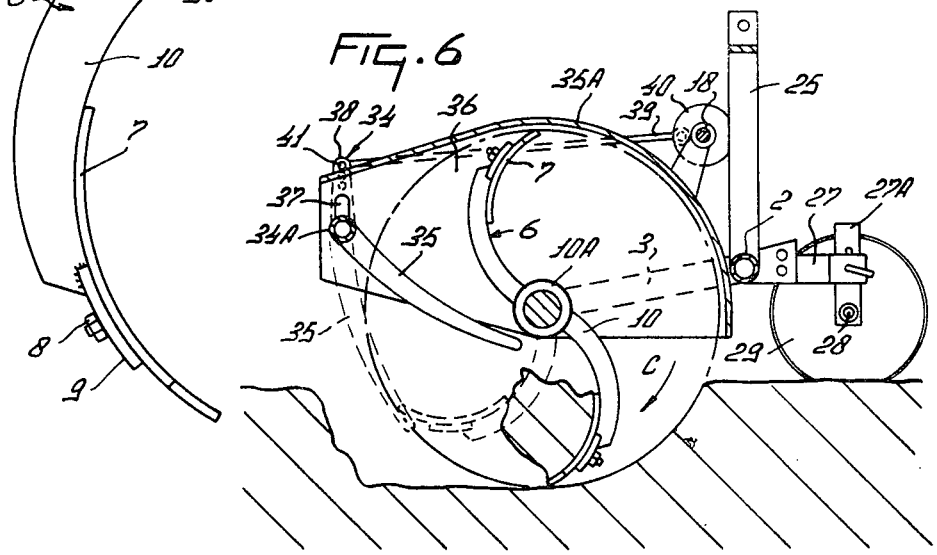

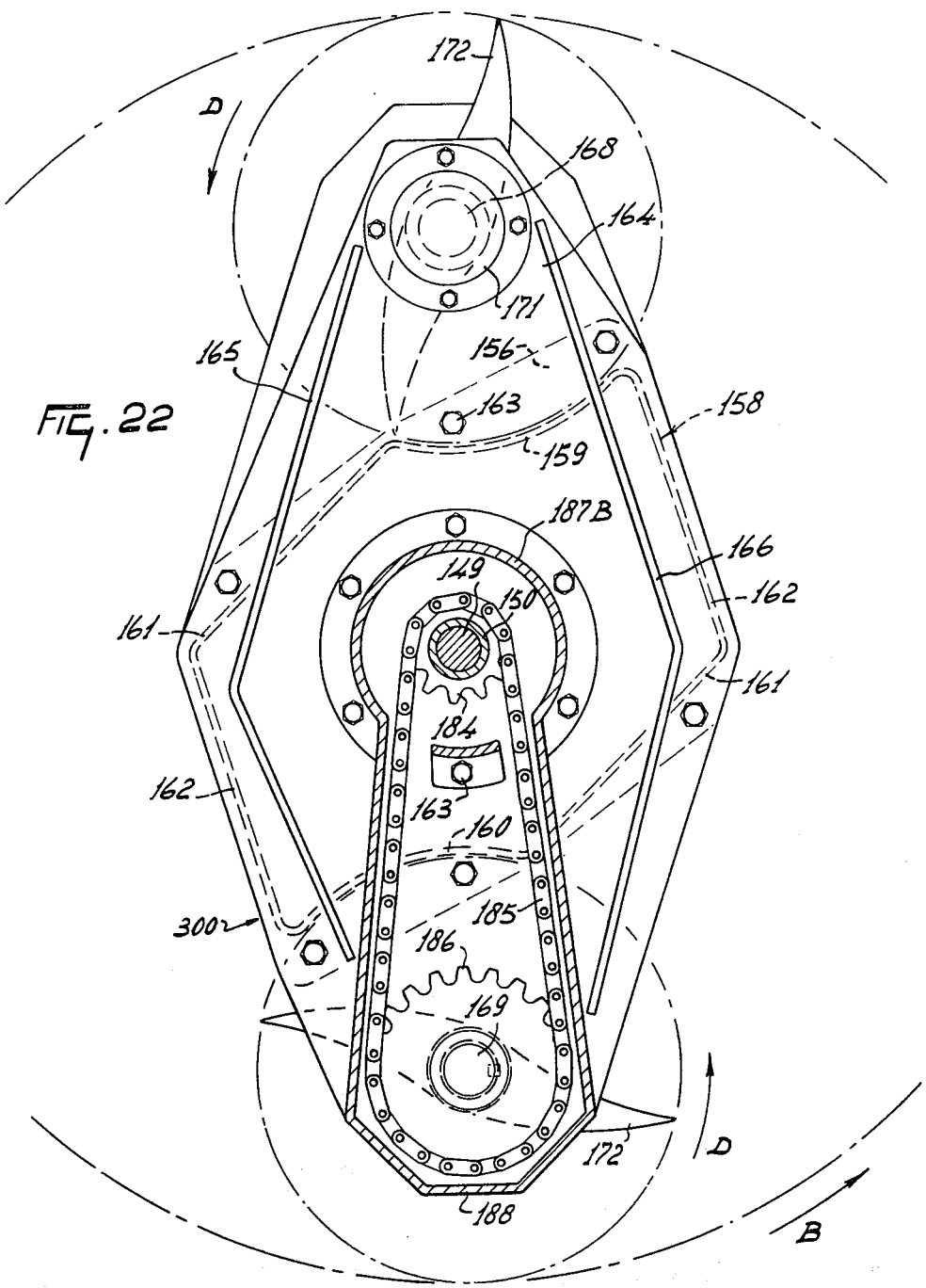

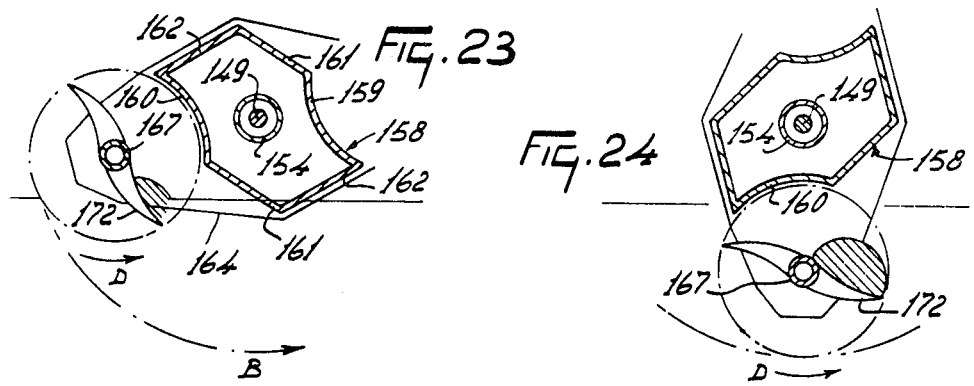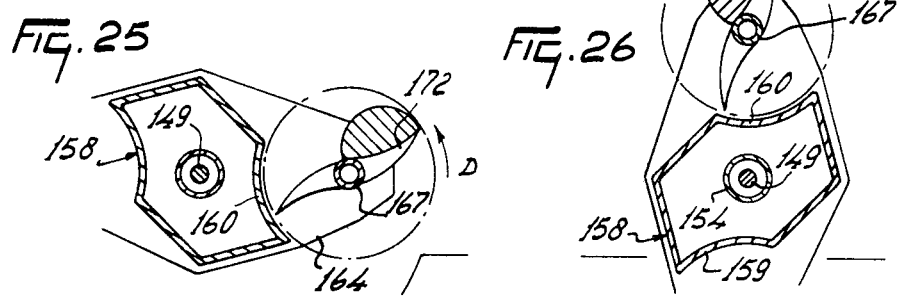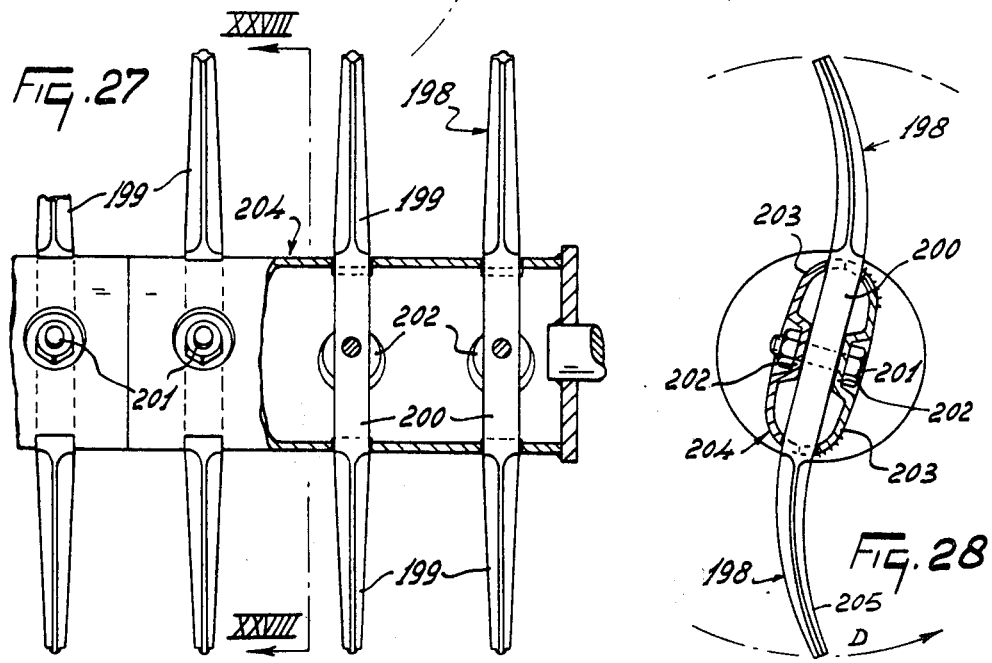

SOIL CULTIVATING IMPLEMENTS

Known implements of this kind have soil working members that act more or less individually to produce an intensive crumbling of the soil. This can be a disadvantage, particularly when the worked soil is left exposed to the prevailing weather conditions for a long time as heavy soils tend to silt up and lighter soils to become scattered, thus having an adverse effect upon the soil structure as a whole.

According to the present invention, there is provided a soil cultivating implement of the kind set forth, wherein active or soil working portions of at least some neighbouring soil working members are arranged to act in unison during the operation of the implement in displacing successive substantially coherent slices of soil rearwardly with respect to the direction of operative travel, each such substantially coherent slice having a length in said direction of not less than substantially 50 centimeters.

Figure 3:
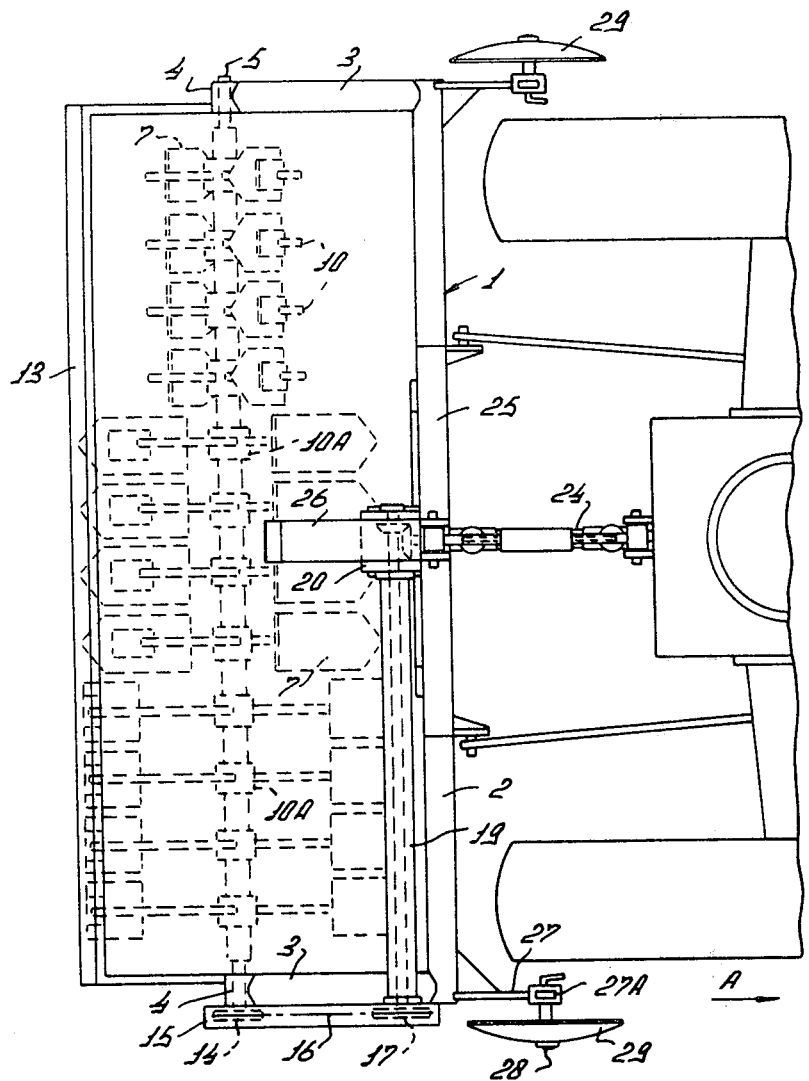
Figure 7:
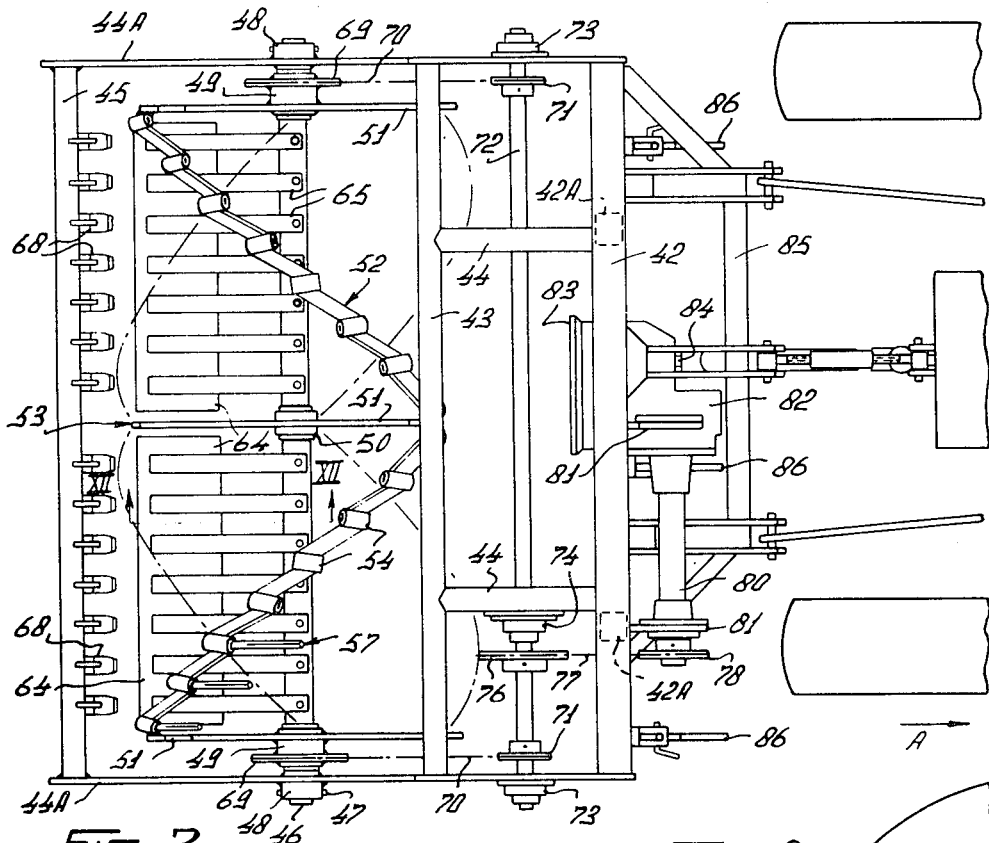
Figure 8:
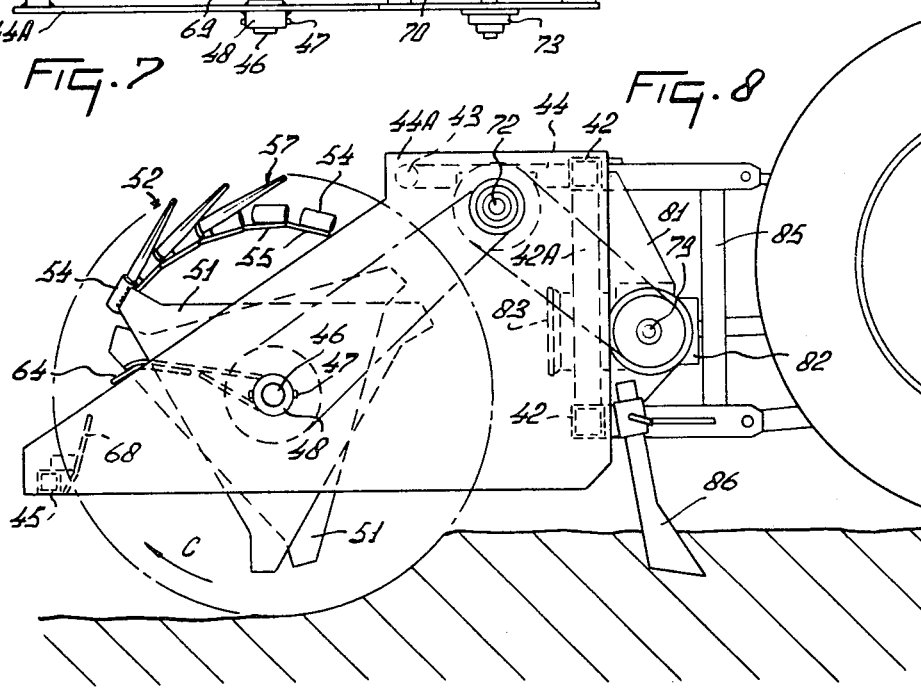
Figure 9:
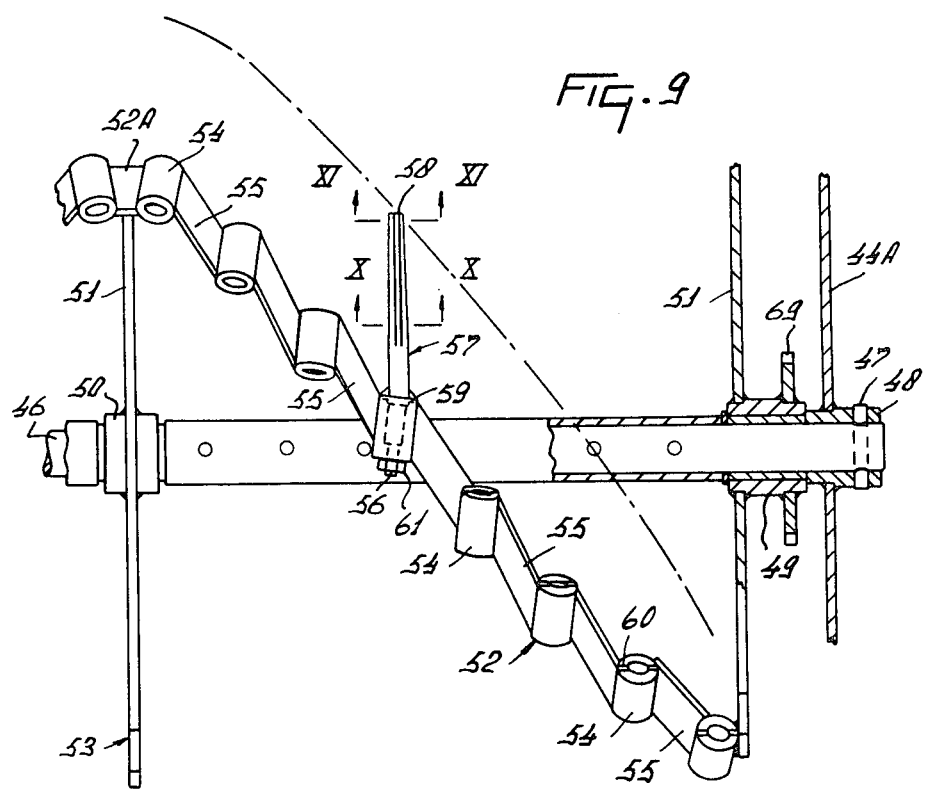
Figures 10, 11:
Figures 12, 13:
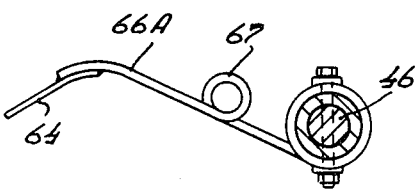
Figure 14:
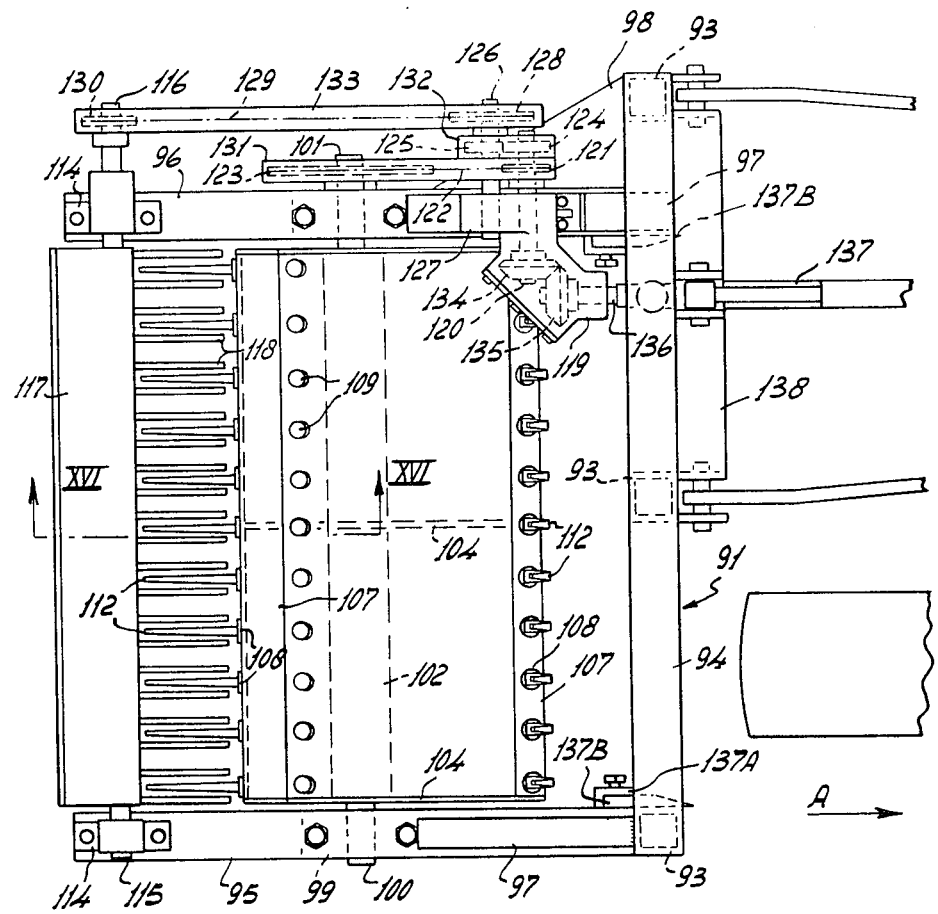
Figure 17:
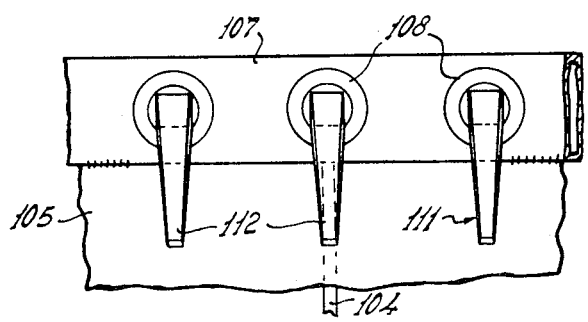
Figure 15:
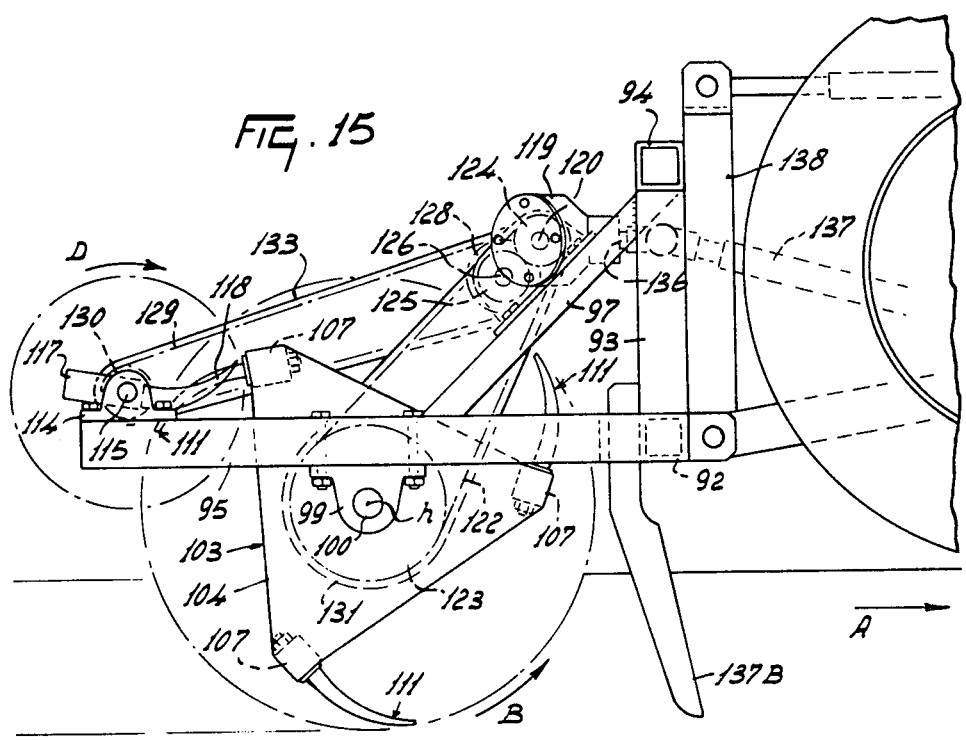
Figure 16:
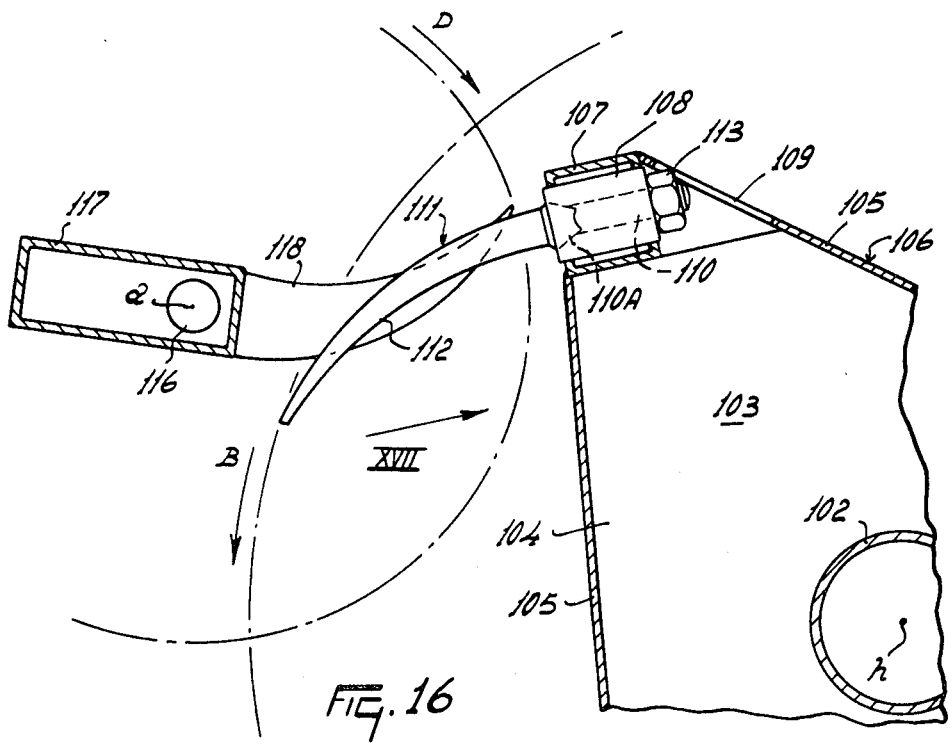
Figure 18:
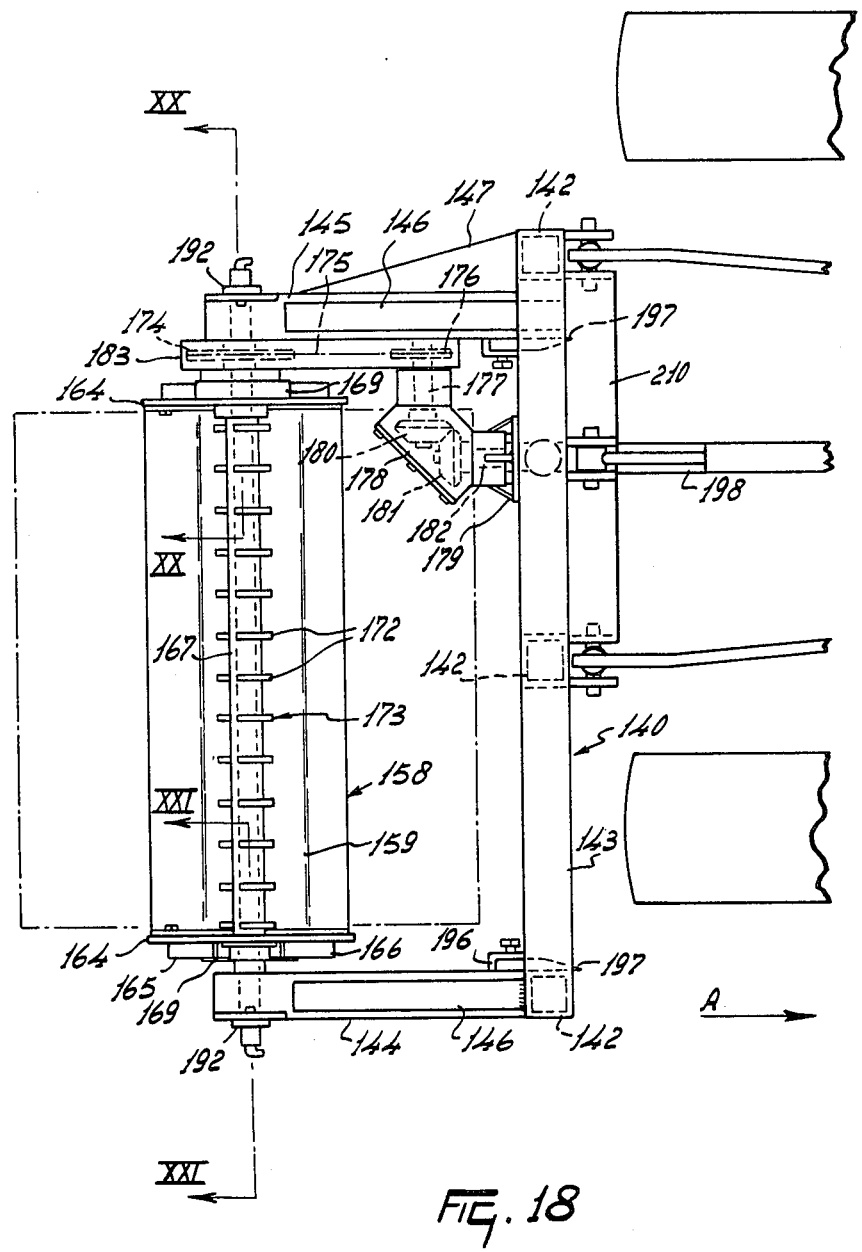
Figure 19:
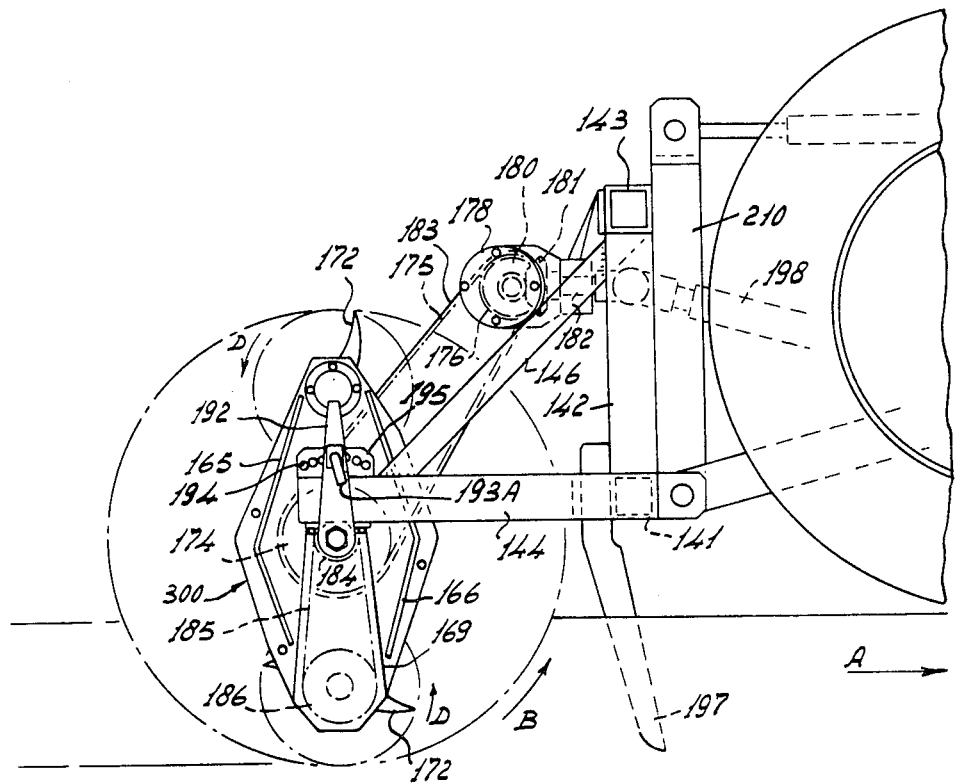
Figure 20:
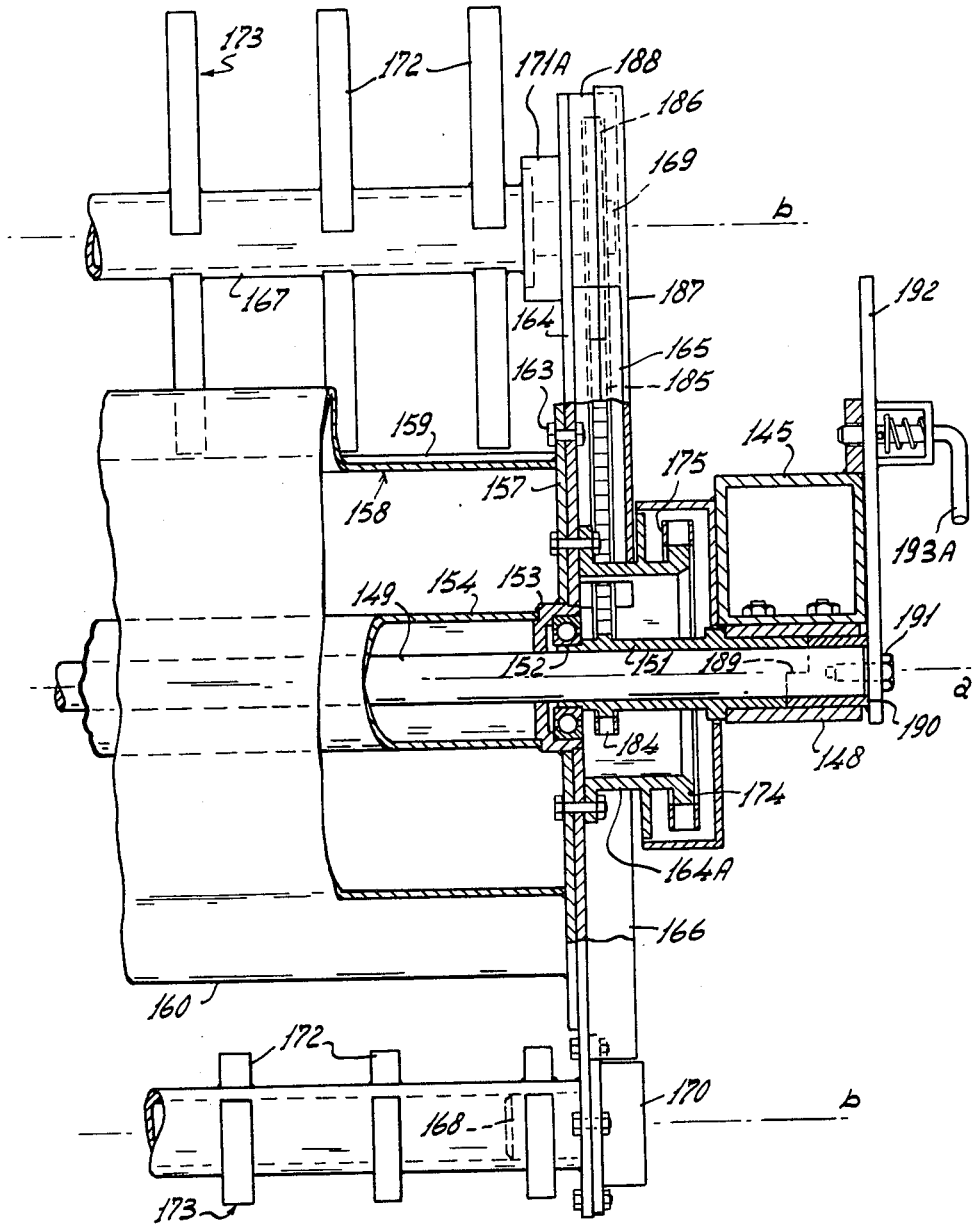
Figure 21:
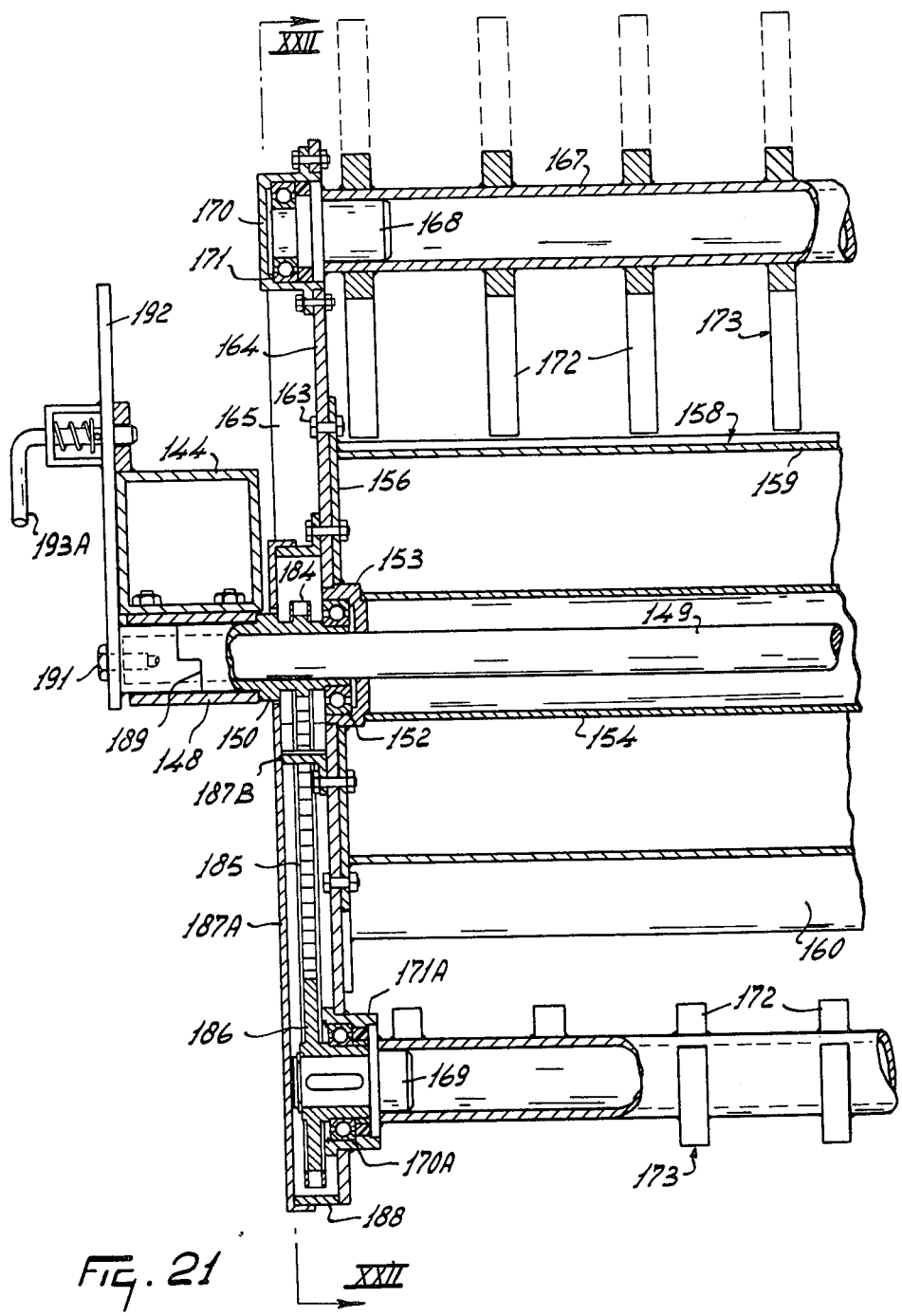

For a better understanding of the invention, and to show how the same may be carried into effect, reference will now be made, by way of example, to the accompanying drawings, in which:

FIG. 1 is a plan view of a soil cultivating implement or harrow in accordance with the invention coupled to the rear of an agricultural tractor, FIG. 2 is a side elevation corresponding to FIG. 1, FIG. 3 is a plan view of an alternative soil cultivating implement or harrow in accordance with the invention mounted at the rear of an agricultural tractor, FIG. 4 is a scrap sectional view, to an enlarged scale, showing the construction and arrangement of parts of the implement of FIG. 3 in greater detail, FIG. 5 is a view as seen in the direction indicated by an arrow V in FIG. 4, FIG. 6 is a sectional side elevation illustrating a third cultivating implement or harrow in accordance with the invention, FIG. 7 is a plan view illustrating a fourth form of coil cultivating implement or harrow in accordance with the invention mounted at the rear of an agricultural tractor, FIG. 8 is a side elevation corresponding to FIG. 7, FIG. 9 is a part-sectional elevation, to an enlarged scale, illustrating the construction and arrangement of soil working members of the implement or harrow of FIGS. 7 and 8 in greater detail, FIG. 10 is a section, to an enlarged scale, taken on the line X—X of FIG. 9, FIG. 11 is a section, to an enlarged scale, taken on the line XI—XI of FIG. 9, FIG. 12 is a section, to an enlarged scale, taken on the line XII—XII of FIG. 7, FIG. 13 is a similar view to FIG. 12 but illustrates an alternative construction, FIG. 14 is a plan view of a further form of soil cultivating implement or harrow in accordance with the invention mounted at the rear of an agricultural tractor, FIG. 15 is a side elevation, corresponding to FIG. 14, FIG. 16 is a section, to an enlarged scale, taken on the line XVI—XVI of FIG. 14, FIG. 17 is a scrap elevation as seen in the direction indicated by an arrow XVII in FIG. 16, FIG. 18 is a plan view of a further embodiment of a soil cultivating implement or harrow in accordance with the invention mounted at the rear of an agricultural tractor, FIG. 19 is a side elevation corresponding to FIG. 18, FIG. 20 is a section, to an enlarged scale, taken on the line XX—XX of FIG. 18, FIG. 21 is a section, to an enlarged scale, taken on the line XXI—XXI of FIG. 18, FIG. 22 is a section taken on the line XXII—XXII of FIG. 21, FIG. 23 to 26 inclusive are diagrams, to a reduced scale as compared with FIG. 22, illustrating successive positions of a soil working member of the implement or harrow during the operation of the latter, FIG. 27 is an elevation illustrating an alternative tine construction and mounting for the implement or harrow of FIGS. 18 to 26, and FIG. 28 is a section taken on the line XXVIII—XXVIII of FIG. 27.

Referring to FIGS. 1 to 6 of the drawings, the soil cultivating implements or harrows (hereinafter referred to as "cultivators" for the sake of brevity) that are illustrated therein have a frame 1 which includes a substantially horizontal beam 2 that extends substantially perpendicular to the intended direction of operative travel A of the cultivator. The opposite ends of the beam 2 have arms 3 secured to them which arms are inclined downwardly, and rearwardly with respect to the direction A, from the beam 2. The ends of the arms 3 that are remote from the beam 2 carry substantially horizontal bearings 4 in which a substantially horizontal shaft 5 is mounted so as to be rotatable about an axis that is parallel to the frame beam 2. In the embodiment of FIGS. 1 and 2 of the drawings, the shaft 5 is provided with a plurality of neighbouring soil working members 6 that are arranged in pairs and in two rows. As can be seen in FIG. 2 of the drawings, the soil working members 6 of each pair are angularly offset from one another around the axis of rotation of the shaft 5 by substantially 180°. Each soil working member 6 comprises an active portion in the form of a blade 7 whose effective surface extends transverse to the intended direction of rotation B (FIG. 2) and thus generally parallel to the shaft 5. The blade 7 has a width in the direction which has just been mentioned that is substantially one-third of its curved length.

It can be seen from FIG. 4 of the drawings that the blades 7 are fastened by screwthreaded bolts or studs 8 to blade supports 9 that are welded to the free ends of curved supporting arms 10. The opposite ends of the supporting arms 10 are fastened to the shaft 5 through the intermediary of bushes 10A (FIG. 1) that are arranged around that shaft. As can be seen from FIG. 4 of the drawings, both the blades 7 and the supporting arms 10 are of matchingly curved shape, said arms 10 being connected to the shaft 5 in such a way that the tapering free ends of the blades 7 are orientated forwardly with respect to the intended direction of rotation B(FIG. 2) of the shaft 5. The free end or tip of each blade 7 is located forwardly, with respect to the direction B, from a line extending radially from the axis of rotation of the shaft 5 and passing through the location at which the corresponding supporting arm 10 is connected to that shaft. A substantially vertical plane of symmetry of each blade 7 coincides, or substantially coincides, with a vertical plane located in the thickness of the corresponding supporting arm 10, said plane or planes being perpendicular to the axis of the shaft 5. Immediately neighbouring soil working members 6 are angularly offset from one another around the axis of the shaft 5 in such a way that the rows thereof extend helically around said axis. The widths of the blades 7 in a direction parallel to the longitudinal axis of the shaft 5 are only slightly smaller than the distances between immediately neighbouring soil working members 6 so that, as can be seen in FIG. 1 of the drawings, the perpendicular distance between two immediately neighbouring blades 7 in said direction is minimal.

The shaft 5 and the soil working members 6 are partially surrounded by a curved hood or baffle 11 whose centre of curvature coincides, or substantially coincides, with the axis of rotation of the shaft 5, the leading extremity of said hood or baffle with respect to the direction A being located at substantially the same horizontal level as the shaft 5. The hood or baffle 11 has substantially vertical side or end walls 12 and a bracket 13 whose limbs are connected to the arms 3 supports the rear edge of the hood or baffle and the rear edges of the side or end walls. One end of the shaft 5 carries a sprocket wheel 14 that is located inside a protective casing 15. An endless transmission chain 16 places the sprocket wheel 14 in driven connection with a further sprocket wheel 17 that is fastened to one end of a shaft 18 which extends substantially horizontally perpendicular to the direction A. The shaft 18 is located in a tubular casing 19 and the end of the said shaft 18 that is remote from the sprocket wheel 17 projects into a gear box 20 that is located substantially centrally of the cultivator. A bevel pinion 21 is secured to the shaft 18 inside the gear box 20 and its teeth are in driven mesh with those of a further bevel pinion 22 fastened to a rotary input shaft 23 of the gear box 20 which shaft has a splined or otherwise keyed end which projects forwardly from said gear box in a direction substantially parallel to the direction A. The rotary input shaft 23 can be placed in connection with the power take-off shaft of an operating agricultural tractor or other vehicle with the aid of an intermediate telescopic transmission shaft 24 of a construction that is known per se having universal joints at its opposite ends. Both the tubular casing 19 and the gear box 20 are arranged just behind, with respect to the direction A, a generally triangular coupling member or trestle 25 whose base is secured to the frame beam 2. The coupling member 25 can be employed in the manner illustrated in outline in FIGS. 1 and 2 of the drawings in connecting the frame 1 of the cultivator to a three-point lifting device or hitch mounted at the rear of the operating agricultural tractor or other vehicle. A strenghtening strut 26 rigidly interconnects the apex of the coupling member or trestle 25 and a location at the top and center of the hood or baffle 11.

Arms 27 project forwardly with respect to the direction A from opposite ends of the frame beam 2, in substantial register with the arms 3, and their leading ends carry upright supports 27A that can be adjusted upwardly and downwardly in position relative to the arms 27 in the simple manner that is illustrated in the drawings. The lower end of each upright support 27A has a corresponding cap-shaped cutter disc 29 rotatably connected to it with the aid of a corresponding axle shaft 28 that defines an axis of rotation extending substantially parallel to the frame beam 2 and thus substantially horizontally perpendicular to the direction A. The hollow or concave sides of the two discs 29 face inwardly of the cultivator towards one another so that, when said discs make cuts in the ground during the operation of the cultivator, the outer boundaries of those cuts are urged away from the cultivator to some extent so that the definition of the strip of soil that is to be worked by the members 6 is improved.

In the use of the cultivator illustrated in FIGS. 1 and 2 of the drawings, its coupling member or trestle 25 is connected to the three-point lifting device or hitch of an agricultural tractor or other operating vehicle in the manner illustrated in the drawings and the transmission shaft 24 is employed to place the input shaft 23 of the gear box 20 in driven connection with the power take-off shaft of the same tractor or other vehicle. Rotation is transmitted to the shaft 5 from the gear box 20 by way of the shaft 18, the sprocket wheels 14 and 17 and the transmission chain 16 and said shaft revolves in the direction B that is indicated in FIG. 2. The adjacent blades 7 of the soil working members 6 of the two helical rows act together to loosen slices of soil throughout substantially the whole of the width of the cultivator, said slices being displaced upwardly in the direction B over the top of the shaft 5 and subsequently rearwardly with respect to the direction A. As the blades 7 pass downwardly in the direction B beyond the highest points of their paths of rotation, gravity causes the displaced slice of earth to fall downwardly so that it lands in the freshly excavated furrow in a substantially inverted condition as compared with its original disposition before displacement. The very close proximity of the neighbouring blades 7 to one another enables a complete slice extending throughout substantially the whole of the working width of the cultivator to be loosened and displaced without difficulty. The helical winding of the rows of soil working members 6 around the axis of the shaft 5 avoids any "drag and snatch" operation which would inevitably occur if the soil working members 6 were to be arranged in rows extending strictly parallel to the axis of the shaft 5. The cutter discs 29 act to define the boundaries of the strip of soil that is worked by the cultivator during a single traverse. The length in the direction A of each slice of soil that is cut by the members 6 is not less than 50 centimeters and preferably has a greater magnitude that may conveniently be equal to approximately half the working width of the cultivator. The working width which has just been mentioned may conveniently be substantially 150 centimeters and it will be noted that this width is approximately the same as that of the path of travel of many agricultural tractors.

In the embodiment of FIG. 3 of the drawings, the soil working members 6 are arranged in groups with the members 6 in each group disposed in two parallel rows that are angularly offset from one another around the axis of the shaft 5 by 180°. There are three groups and these groups, as a whole, are angularly offset from one another around the axis of the shaft 5 at 120° intervals. The construction and operation of the cultivator of FIG. 3 is identical to that which has already been described apart from the arrangement of the soil working members 6. During the use of the cultivator, the blades 7 of the soil working members 6 will loosen and displace slices of soil having widths that are substantially equal to the width of the corresponding group. The length of each slice in the direction A is, however, again not less than substantially 50 centimeters.

FIGS. 4 and 5 illustrate a mounting of the soil working members 6 in which the fixed bushes 10A are replaced by bushes or sleeves 30 that are turnable to some extent around the axis of the shaft 5. A transverse pin 32 is entered through the shaft 5 and its projecting ends constitute stops that are lodged in slots 33 formed in the wall of the bush 30 concerned. A spring mechanism 31 is provided which comprises a coil spring 31A that is wound around the shaft 5 alongside the corresponding bush 30 with one end anchored to the shaft and its opposite end anchored to the supporting arm 10 that is rigid with said bush 30. It will be noted from FIG. 4 of the drawings that the end of the coil spring 31A that is anchored in the shaft 5 projects into a substantially radial hole in that shaft so far as to enable it also to enter a bore, groove or other recess in the transverse pin 32. The coil spring 31A thus also acts to prevent unwanted axial displacement and loss of the transverse pin 32. The spring 31A is arranged in such a way as to urge the bush 30 and the soil working members 6 which it carries around the shaft 5 in a direction corresponding to the direction B (FIG. 2) until the ends of the slots 33 stop any further movement in the same direction by meeting the projecting ends of the pin 32.

In the use of a cultivator provided with soil working members 6 arranged in accordance with the embodiment of FIGS. 4 and 5 of the drawings, the resistance of the soil to penetration by the blades 7 of the members 6 will cause the coil springs 31A to be tightened until the ends of the slots 33 that correspond to the end that is shown as "free" in FIGS. 4 and 5 engage the stops afforded by the ends of the pins 32. However, once a slice of soil has been loosened and displaced upwardly around the shaft 5 by the blades 7, the springs 31A will tend to revert rapidly to their original configurations thus moving the arms 10 forwardly in the direction B. This movement tends to facilitate the release of the slice of soil from the blades 7 and is particularly useful when working on very heavy and/or sticky soil.

FIG. 6 of the drawings illustrates a cultivator which is basically similar to the cultivators that have already been described except that, in this case, the shaft 5 is driven in the opposite direction which is such that the soil working members 6 move through the soil in a direction C which is generally rearward with respect to the direction A rather than forward relative thereto with the direction of rotation B. The positions of the soil working members 6 with rspect to the shaft 5 are also reversed as compared with those that are employed with the direction of rotation B and, in the embodient of FIG. 6, the slices of displaced soil that are moved in the direction C by the blades 7 are removed from those blades by a scraper mechanism 34. The scraper mechanism 34 comprises a shaft-like support 34A that extends substantially parallel to the axis of the shaft 5 and that is provided at regular intervals along its length with a plurality of scrapers 35 that extend in a row in spaced side-by-side relationship. The scrapers 35 are so positioned that they coincide with the narrow gaps between the immediately neighbouring blades 7 so that there will be one scraper 35 to pass through each gap between two immediately neighbouring blades 7. Each scraper 35 is of gently curved configuration as seen in side elevation (FIG. 6) and tapers slightly towards the end thereof that is remote from the support 34A. The direction of curvature of each scraper 35 is such that it is the upper side or edge thereof that is of concave configuration and the lower side or edge thereof that is convex. Each scraper 35 substantially coincides with a substantially vertical plane that is perpendicular to the axis of the shaft 5. The ends of the shaft-like support 34A are entered through substantially vertical slots 37 in the side or end walls 36 of a hood or baffle 35A that partially surrounds the shaft 5 and soil working members 6. The hood or baffle 35A and the side or end walls 36 are generally similar to the parts 11 and 12 that have previously been described but it will be seen from FIG. 6 of the drawings that the shapes of their rear regions with respect to the direction A are somewhat modified in consequence of the provision of the scraper mechanism 34.

One end of the support 34A carries a generally upright arm 38 that is pivotally coupled to one end of a connecting rod 39 by entering said end through any chosen one of a row of holes 41 in the arm 38. The opposite end of the connecting rod 39 is pivotally coupled to an eccentric 40 connected to the shaft 18 in such a way that, during operation, the pivotal connection of the rod 39 to the eccentric 40 will orbit circularly around the axis of the shaft 18. The speed of rocking movement of the scrapers 35 which occurs during the use of the cultivator can be varied to suit the nature of the soil that is to be worked and its moisture content by engaging the end of the connecting rod 39 remote from the eccentric 40 in an appropriate one of the holes 41. It is also possible to vary the distance over which the scrapers 35 can move between the blades 7 for the same purposes by employing set bolts (not illustrated) to dispose the support 34A at chosen levels along the upright slots 37. For example, when working in very heavy soil, it will be desirable for the scapers 35 to be set somewhat lower (as illustrated) than would be desirable when working in lighter soil because the heavy soil is less readily released from the curved surfaces of the blades 7. Generally speaking, release of soil from the blades 7 is impeded in proportion to the moisture content of the soil so that, under very wet conditions, the support 34A should be set at a lower level than would be needed when working fairly dry soil. During the use of the cultivator illustrated in FIG. 6 of the drawings, the blades 7 of the soil working members 6 that are moving in the direction C loosen successive slices of soil that are elongated in a direction substantially horizontally perpendicular, or at least transverse, to the direction A and each such slice is displaced upwardly in the direction C and rearwardly with respect to the direction A. As the blades 7 move upwardly, a slice of soil which they are carrying is pushed off the blades by the scrapers 35 that are turning downwardly around the axis of the support 34A at the same time. The slice of soil thus falls into the excavated furrow in a substantially inverted condition. The drive to the scraper mechanism 34 is so arranged that the scrapers 35 will be in their uppermost positions, substantially corresponding to the position shown in full lines in FIG. 6 of the drawings, at the approach, in the direction C, of each row of blades 7. FIG. 6 also shows, in broken lines, a lowermost position of one of the scrapers 35 and the corresponding position of one of the soil working members 6 at the same instant.

FIGS. 7 to 13 of the drawings illustrate a cultivator having a frame which comprises two substantially parallel beams 42 that are arranged one above the other in spaced relationship with each beam extending substantially perpendicular to the direction A, said beams 42 being of hollow and square cross-sectional configuration and being rigidly interconnected by two vertical or at least upright beams 42A of similar configuration. A further substantially horizontal beam 43 that is of circular cross-section extends parallel to the upper beam 42 at substantially the same horizontal level as that beam but to the rear thereof with respect to the direction A. Two horizontally spaced apart supports 44 that extend substantially parallel to the direction A rigidly interconnect the upper beam 42 and the beam 43 which has just been mentioned. The beams 42 and 43 are all of the same length and their corresponding free ends are rigidly secured to substantially vertical side or end plates 44A. The shape of said side or end plates 44A can be seen in FIG. 8 of the drawings and it will be noted that their rearmost extremities with respect to the direction A are rigidly interconnected by a further substantially horizontal beam 45 of square cross-section that is disposed parallel to be beams 42 and 43. Substantially horizontally aligned bushes 48 are fastened to the two plates 44A in generally central regions of those plates. A shaft 46 that is parallel to the beams 42, 43 and 45 is entered through the two bushes 48 and is prevented from moving either turnably or axially with respect thereto by transverse pins 47 whose arrangement can be seen best in FIG. 9 of the drawings. Bearings 49 and 50 rotatably surround the shaft 46, the bearings 49 being located near the opposite ends of that shaft and the bearing 50 being located substantially centrally therealong. Plate-shaped supports 51 that are of substantially triangular configuration are secured to the bearings 49 and 50 so as to lie in planes that are perpendicular to the axis of the shaft 46. The shaft 46 passes centrally through each support 51 and it will be noted from FIG. 8 of the drawings that the two supports 51 that are located close to the opposite ends of said shaft are angularly offset around the axis thereof by a few degrees as compared with the support 51 carried by the bearing 50 that is disposed substantially centrally along said shaft.

The corners of the generally triangular supports 51 carry the ends of elongated tine supports 52, each support 52 subtending an angle of substantially 120° at the axis of the shaft 46 when it is viewed lengthwise of that axis. When viewed in a direction perpendicular to the axis of the shaft 46 (FIGS. 7 and 9), pairs of the elongated tine supports 52 extend in substantially V-shaped relationship with the point of each V disposed at the central one of the three substantially triangular supports 51 and with said point disposed forwardly from the free ends of the V with respect to the direction C. The substantially triangular supports 51 and the elongated tine supports 52 together afford a rotary supporting structure that is generally indicated by the reference 53. Each elongated tine support 52 comprises a succession of relatively spaced tine holders 54 that are interconnected by strips 55, the two supports 52 of each pair being interconnected at the central substantially triangular support 51 by a corresponding coupling strip 52A (FIG. 9). Each holder 54 receives a fastening portion 56 of a corresponding rigid tine 57, the fastening portions 56 being integrally connected by angular junctions with active or soil working portions 58 of the tines. The arrangement is such that the soil working portions 58 of the tines extend substantially tangentially with respect to circles centered upon the longitudinal axis of the shaft 46. The fastening portion 56 of each tine 57 is provided with two diametrically opposed projections or lugs 59 that are arranged to fit in grooves or recesses 60 in one end of the co-operating tine holder 54, said projections or lugs 59 being located in the region of the angular junction between the two portions 56 and 58 of each tine 57. The free end of each tine fastening portion 56 is screw-threaded to receive a corresponding retaining nut 61 and it will be seen that, when the projections or lugs 59 are lodged in the grooves or recesses 60 and the corresponding nut 61 is tightened, the tine 57 concerned will be fixedly retained in its holder 54 and will not be able to turn about the longitudinal axis of that holder. The active or soil working portions 58 of the tines 57 are straight and, as previously mentioned, extend substantially tangentially with respect to circles centered on the longitudinal axis of the shaft 46 and thus generally in the direction C. The active or soil working portion 58 of each tine 57 is of an angular or polygonal cross-section and tapers towards its free end or tip. FIG. 10 of the drawings shows a cross-section of one of the active or soil working portions 58 towards the junction of that portion with the corresponding fastening portion 56 while FIG. 11 shown the cross-sectional configuration of said portion 58 very close to the free end or tip thereof. It will be seen from these Figures that the portion 58 is progressively flattened towards its free end or tip in such a way that, with the generally rectangular cross-section embodiment that is illustrated, one diagonal between two opposite corners as seen in FIG. 11 has a considerably greater length than the other. It should be noted that the tines 57 are arranged so that the diagonals of greater length (as seen in FIG. 11) extend substantially parallel to the axis of the shaft 46. It can also be seen from FIGS. 10 and 11 that each side, in cross-section, of the illustrated soil working portion, 58 is formed with concave, or at least hollow curved, grooves 62 and that these grooves extend throughout a major part of the length of the soil working portion 58 and along to its free end or tip. Two scrapers 64 are indirectly connected to the shaft 46 by a plurality of strip-shaped arms 65 that all project rearwardly from said shaft 46 with respect to the direction A in horizontally spaced apart relationship and at the same angular inclination around the axis of the shaft. Strengthening strips 66 (FIG. 12) rigidly interconnect a mounting sleeve that surrounds the shaft 46 and each of the arms 65 at a point on the lower surface, and near the center, of the latter. The arms 65 may conveniently be made from a resilient material such as spring steel. In the embodiment which is illustrated, each scraper 64 co-operates with three soil working members that are each afforded by one of the elongated time supports 52 and the corresponding tine holders 54 and tines 57. The plate-shaped scrapers 64 may themselves conveniently also be formed from a resilient material such as spring steel. The beam 45 is also provided with a plurality of horizontally spaced apart scrapers 68 that may conveniently be equal in number to the number of strips 65 that are provided. Each scraper 68 is of plate- or strip-like formation and all of them are arranged to extend upwardly from the beam 45 and forwardly at a few degrees to the vertical with respect to the direction A. FIG. 13 of the drawings illustrates an alternative construction and mounting of the scrapers 64. In this embodiment, the scrapers 64 are somewhat smaller in size and are connected to the shaft 46 by a plurality of resilient arms or rods 66A each of which includes at least one resilient loop 67.

Each of the bearings 49 for the rotary supporting structure 53 is provided with a sprocket wheel 69 that is in driven communication, by way of a corresponding transmission chain 70, with a corresponding smaller sprocket wheel 71 mounted on a rotary shaft 72 that extends substantially horizontally parallel to the beams 42, 43 and 45 between horizontal bearings 73 carried by the side or end plates 44A. An additional and relatively aligned horizontal bearing 74 that is carried by one of the supports 44 rotatably receives an intermediate portion of the shaft 72. The shaft 72 carries a sprocket wheel 76 close to the bearing 74 and said sprocket wheel 76 is in driven connection with a sprocket wheel 78 by way of a transmission chain 77. The sprocket wheel 78 is secured to one end of a shaft 79 that extends substantially horizontally in a tubular casing 80 that is parallel to the beams 42, 43 and 45. The casing 80 is fastened to a projecting support 81 at the end thereof adjacent to the sprocket wheel 78, the other end of said casing 80 being secured to a gear box 82. The shaft 79 extends into the gear box 82 and bevel pinions or other transmission members within that gear box place said shaft in driven connection with a rotary input shaft 84 through the intermediary of a change-speed gear 83 that can be pre-adjusted to give a chosen transmission ratio between the input shaft 84 and the shaft 79 but whose construction and arrangement it is not necessary to describe and illustrate in detail. The forwardly projecting rotary input shaft 84 is splined or otherwise keyed to enable it to be placed in driven connection with the power take-off shaft of an operating agricultural tractor or other vehicle through the intermediary of a telescopic transmission shaft of a construction that is known per se having universal joints at its opposite ends.

The front of the cultivator frame is provided with a generally triangular coupling member or trestle 85 adapted to co-operate with the lifting links of a three-point lifting device or hitch carried by an agricultural tractor or other operating vehicle in the manner which can be seen in outline in FIGS. 7 and 8 of the drawings. Opposite end regions of the lower frame beam 42 are provided with upright nearly vertical sleeves in which coulters 86 are upwardly and downwardly adjustable. A third coulter 86 is provided between the two coulters which have just been mentioned at a location, as seen in plan view (FIG. 7), near to the gear box 82.

In the use of the cultivator that has been described with reference to FIGS. 7 to 13 of the drawings, its coupling member or trestle 85 is connected to the three-point lifting device or hitch of an agricultural tractor or other operating vehicle in the manner which is illustrated in outline in FIGS. 7 and 8 of the drawings and the rotary input shaft 84 is placed in driven connection with the power take-off shaft of the same tractor or other vehicle by way of an intermediate telescopic transmission shaft as discussed above. The tines 57 are arranged in helical rows around the axis of the shaft 46 and are rotated around that axis by the drive applied to the rotary input shaft 84 at a speed which will be dependent upon the transmission ratio pre-set by the change-speed gear 83. Owing to the generally V-shaped arrangement of the rows of tines 57 (as seen in plan view) that has been discussed above, with the points of the V's located foremost with respect to the direction C, the soil working portions 58 of those tines 57 that are closest to the center substantially triangular support 51 are the first to penetrate into the soil in respect of each group of tines 57 as the supports 51 rotate. "Drag and snatch" is effectively prevented by the engagement of successive tines 57 with the soil, the portions 58 of those tines acting to cut free transverse slices of soil between the grooves already marked in that soil by the foregoing coulters 86. The slices of soil are carried rearwardly and upwardly by the tines 57 in the direction C and, as soon as said slices are contacted by the scrapers 68 as the tines 57 pass therebetween, said slices are pushed radially inwardly towards the shaft 46 to some extent. This brings said slices completely within the range of the scrapers 64 which scrapers are disposed radially inwardly from the tines 57 and their holders 54 and supports 52. The scrapers 64 positively displace the slices of soil from the tines 57 so that they will drop downwardly, under the action of gravity, into the excavated furrow in a substantially inverted condition. Once again, each slice of soil should have a length in the direction A of not less than substantially 50 centimeters, it being preferred that said length should have a greater magnitude equal to approximately half the working width of the whole cultivator. In the embodiment of FIGS. 7 and 8 of the drawings, this working width is substantially 150 centimeters which width is approximately equal to that of the path of travel of many conventional agricultural tractors.

The arrangement of the soil working portions 58 of the tines 57 in such a way that they extend substantially tangentially with respect to circles centered upon the axis of the shaft 46 provides a very effective penetration of those tines into the soil and a relatively gradual separation of each slice of soil from the ground surface. The free and rear ends of the scrapers 64 are bent over downwardly to some extent and their effect can be completely utilised in shedding the slices of soil from the tines 57 with the arrangement that has been described. The described structure of the active or soil working portions 58 of the tines 57, which structure provides a rectangular or other polygonal cross-section, a tapering configuration in a direction towards the free end or tip and grooves or recesses in the what would otherwise be flat (in cross-section) sides of the tine portions, ensures a satisfactory loosening of the successive slices of soil and is particularly advantageous when heavy and/or wet soil is to be dealt with. As previously described, the active or soil working portion 58 of each tine 57 is flattened progressively towards its free end or tip in such a way that, with the rectangular cross-section that has been described, a diagonal between the furthest remote corners at a location close to the tip of the tine extends substantially parallel to the axis of the shaft 46. It will be realised that this construction provides a relatively broad supporting surface on each tine 57 for the successive slices of soil, the supporting surfaces acting together and extending prependicular or at least transverse to the directions of rotational movement of the tines themselves. Each slice of soil is thus satisfactorily supported for the short period of time that it is carried by the soil working portions 58 of the tines 57, said soil working portions 58 normally acting to break up the soil along more or less natural lines of rupture and with a minimum of smearing of the soil. The capillary structure of the sub-soil is thus not distrubed to any significant extent so that the water economy of the soil is not adversely disturbed and may even be improved. In the embodiment of FIGS. 7 to 13 of the drawings, the rotary supporting structure 53 has a large diameter which may conveniently be substantially 90 centimeters and it has been found that the use of three V-shaped, but cylindrically curved, rows of soil working members that include the tines 57, said rows being angularly offset at substantially 120° intervals around the axis of the shaft 46, provides a cultivator that will operate quietly but with a high working capacity.

FIGS. 14 to 17 of the drawings illustrate a cultivator, which could also be considered as being a rotary plough, having a frame 91 which includes a substantially horizontal frame beam 92 that extends perpendicular, or at least transverse, to the direction A. The frame beam 92 is hollow and preferably, as illustrated, has a square cross-section. The frame 91 includes a number of further hollow beams that will be mentioned below each of those beams preferably also having a square cross-section. Substantially vertical beams 93 are rigidly secured to the opposite ends of the beam 92 so as to project upwardly therefrom and their upper ends, in turn, are rigidly interconnected by a further substantially horizontal beam 94 that extends parallel to the beam 92 but at a higher level than that beam. It will be noted from FIG. 14 of the drawings that a third substantially vertical beam 93 interconnects the beams 92 and 94 approximately midway along the lengths of the last-mentioned beams. Substantially horizontally disposed supporting beams 95 and 96 extend rearwardly with respect to the direction A from one of the free ends of the beam 92 and from a location spaced at a short distance from the other free end of the beam 92 respectively. Inclined strengthening beams 97 rigidly interconnect the beam 94 and the beam 95 and the beam 94 and the beam 96 respectively. A substantially horizontally disposed guard plate 98 of generally triangular configuration has two of its edges secured to the supporting beam 96 and the frame beam 92 (see FIG. 14).

The bottom of each of the supporting beams 95 and 96 is provided, substantially midway therealong, with a corresponding substantially horizontal bearing 99, said bearings rotatably receiving stub shafts 100 and 101. The stub shafts 100 and 101 are provided at the opposite ends of a central support shaft 102 that forms part of a rotor 103 which can revolve between the supporting beams 95 and 96. Support plates 104 of generally triangular configuration are fastened to the central support shaft 102 of the rotor 103 adjacent the opposite ends of that central support shaft and in such a way that their general planes are substantially prependicular to the longitudinal axis $h$ (FIGS. 15 and 16) of said support shaft 102. A third similar support plate 104 (FIG. 14) is fastened to the shaft 102 in a similar disposition at substantially the midpoint of the shaft. The plates 104 are of substantially equilateral triangular configuration when viewed parallel to the axis $h$ (FIG. 15) and their corresponding edges are interconnected by plates 105 that all extend substantially parallel to the axis $h$ and that together form a covering or sheath 106 for the rotor 103, said covering or sheath 106 being of substantially equilateral triangular cross-section. The corresponding corners of the three support plates 104 are interconnected by hollow beams 107 that extend substantially parallel to the axis $h$ and that are preferably of square, or at least rectangular, cross-section, two sides of each beam 107 being substantially parallel to one of the neighbouring plates 105 with this construction (see FIG. 16). Each of the hollow beams 107 is provided at regular intervals along its length with a plurality, such as eleven, of tine holders 108, each holder 108 being of substantially cylindrical configuration with its longitudinal axis nearly tangential to a circle centred upon the axis $h$.

It can be seen from FIG. 16 of the drawings that one end of each holder 108 is located in a position in which it is nearly coplanar with a neighbouring one of the plates 105 whereas the opposite end of said holder 108 is located internally of the sheath 106 that is aforded by the three plates 105. The last-mentioned ends of the holders 108 are accessible through hole 109 in the plate 105 which is closest to those ends. Each holder 108 accommodates the fastening portion 110 of a corresponding tine 111, said fastening portion being provided with a screwthread at at least a free end region thereof. Each tine 111 also includes a curved active or soil working portion 112 and a profiled shoulder 110A at the junction between the two portions 110 and 112 thereof. Each fastening portion 100 is retained in the corresponding holder 108 by a nut 113 mounted on the screwthreaded end of said fastening portion in such a way that the nut is located substantially completely inside the sheath 106 (see FIG. 16). The profiled shoulder 110A co-operates with notches or recesses in the mouth of the holder 108 at the end thereof remote from the corresponding hole 109 and, when the nut 113 is tightened, the shoulder 110A and said notches or recesses co-operate in such a way as to prevent turning movement of the tine 111 in the holder 108 about the axis of its fastening portion 110. The active or soil working portions 112 of the tines 111 are of substantially constant curvature although said portions, which are of a square or other polygonal cross-section, taper progressively from their shoulders 110A to their free ends or tips. As can be seen in FIG. 16 of the drawings, the curvature of each soil working portion 112 is such a that those portions are directed forwardly in substantially the intended direction of rotation B of the rotor 103. As can be seen in FIGS. 15 and 16 of the drawings, the free ends or tips of the soil working portions 112 of the tines 111 are disposed substantially tangentially with respect to circles centered upon the axis $h$ of the shaft 102 which axis is also the axis of rotation of the rotor 103.

Substantially horizontal bearings 114 are provided on top of the two supporting beams 95 and 96 close to the rearmost ends of those beams with respect to the direction A, said bearings 114 accommodating corresponding stub shafts 115 and 116 at the opposite ends of a scraper support 117 that is of oblong rectangular cross-section (see FIG. 16). The scraper support 117 is rotatable about an axis $a$ that coincides with the longitudinal axes of the two stub shafts 115 and 116, the axis $a$ being eccentric with respect to a central longitudinal axis of the support 117 so as to provide a counterbalance and locate the center of gravity of said support 117 and a plurality of scrapers 118 which it carries substantially on the axis $a$. The scrapers 118 are arranged in a plurality of pairs, of which there may be eleven, and it will be seen from FIG. 14 of the drawings that said arrangement is such that, during revolution of the rotor 103 and revolution of the scraper mechanism comprising the support 117 and the scrapers 118, each tine 111 will pass closely between the scrapers 118 of a corresponding pair. Each scraper 118 is of flat strip-shaped configuration but tapers progressively from its root to its free end or tip. Each scraper 118 is also of curved configuration, the curvature being such as to direct it rearwardly with respect to the intended direction of rotation D of the scraper mechanism. The axis of rotation $a$ of the scraper mechanism is located at a somewhat higher horizontal level than the axis of rotation $h$ of the rotor 103, the perpendicular spacing between said levels being chosen to ensure that the soil working portion 112 of each tine 111 moves between the corresponding pair of scrapers 118 throughout substantially the whole of its length.

A gear box 119 is fastened to the supporting beam 96 and to the corresponding inclined beam 97 and accommodates a substantially horizontal rotary shaft 120 that extends substantially perpendicular to the direction A and parallel to the axes $a$ and $h$. One end of the shaft 120 projects from the gear box 119 and carries a sprocket wheel 121 that drives a larger sprocket wheel 123 by way of a transmission chain 122. The sprocket wheel 123 is rigidly secured to the stub shaft 101 at one end of the central support shaft 102 of the rotor 103. The shaft 120 projects from the gear box 119 beyond the sprocket wheel 121 and carries a tooth pinion 124 whose teeth are in driving mesh with those of a second toothed pinion 125 of the same size as the pinion 124, said second pinion 125 being mounted on a rotary shaft 126 journalled in bearings carried by supports that are located beneath the gear box 119. The rotary shaft 126 also carries a sprocket wheel 128 which is drivingly connected to a smaller sprocket wheel 130 by a transmission chain 129. The sprocket wheel 130 is fastened to the stub shaft 116 at one end of the scraper support 117. Protective casings 131, 132 and 133 (FIG. 14) surround the three sprocket wheel/chain and tooth pinion assemblies that have just been described. The drives to the rotor 103 and to the scraper mechanism are such that the latter rotates in the direction D, which is opposite to the direction of rotation B of the rotor 103, at a speed which is three, or a multiple of three, times as great as the speed of rotation of the rotor 103. The shaft 120 is provided, inside the gear box 119, with a bevel pinion 134 whose teeth are in driven mesh with those of a further bevel pinion 135 carried by a shaft 136 having a splined or otherwise keyed portion that projects forwardly in substantially the direction A from the front of the gear box 119 to serve as a rotary input shaft. In the use of the cultivator or rotary plough, the forwardly projecting end of the shaft 136 is placed in driven connection with the power take-off shaft of an agricultural tractor or other operating vehicle through the intermediary of a telescopic transmission shaft 137 of a construction that is known per se having universal joints at its opposite ends. Holders 137A for upwardly and downwardly adjustable coulters 137B are provided in the corners between the beams 92 and 95 and 92 and 96 respectively, said coulters 137B preferably being spaced apart by a distance of substantially 1 meter which distance is also substantially equal to the working width of the tined rotor 103 measured lengthwise of the axis $h$.

The fronts of the frame beams 92 and 94 are provided with a generally triangular coupling member or trestle 138 which is arranged for connection to the free ends of the lifting links of a three-point lifting device or hitch carried by a tractor or other operating vehicle in the manner which can be seen in outline in FIGS. 14 and 15 of the drawings. It will be noted from FIG. 14 of the drawings that the coupling member or trestle 138 is located at one side of the cultivator or rotary plough with respect to the intended direction of operative travel A so that neither of the coulters 137B is in line with any ground wheels of the operating tractor or other vehicle with the result that the cultivator or rotary plough can work a strip of land which is laterally offset to one side of, but in overlapping relationship with, the path of travel of the operating tractor or other vehicle.

In the use of the cultivator or rotary plough that has been described with reference to FIGS. 14 to 17 of the drawings, its coupling member or trestle 138 is connected to the three-point lifting device or hitch at the rear of the operating tractor or other vehicle in the manner shown in outline in FIGS. 14 and 15 of the drawings. The telescopic transmission shaft 137 is employed to place the rotary input shaft 136 of the gear box 119 in driven connection with the power takeoff shaft of the same tractor or other operating vehicle. As the cultivator or rotary plough is moved over the ground in the direction A, the tined rotor 103 and the scraper mechanism 117/118 rotate in the opposite directions B and D resepctively, the speed of rotation of the scraper mechanism 117/118 being three, or a multiple of three, times greater than that of the rotor 103. The speed of rotation of the rotor 103 may advantageously be between substantially 150 and substantially 200 revolutions per minute. The curved soil working portions 112 of the tines 111, whose tips are substantially tangentially disposed with respect to circles centred upon the axis $h$, pass through the soil in a generally forward direction with respect to the direction A (see FIG. 15) and each of the three rows of tines 111 cuts out and lifts a slice of soil around the axis $h$ in the direction B. As each slice of soil is carried rearwardly over the axis $h$, it is supported by the neighbouring plate 105 that lies therebeneath at that time. Gravity then tends to cause disengagement of the successive slices of soil from the tines 111 in such a way that said slices slide over the plates 105. This disengagement is positively assisted by the scrapers 118 which pass by each side of each tine portion 112 to push the successive slices downwardly into the newly excavated furrow in substantially inverted dispositions. It shold be noted that the greater speed of movement of the scrapers 118 provides a very effective downward pushing movement against each successive slice of soil. Each successive slice of soil is cut, lifted, inverted and replaced, in an inverted condition, in substantially the place from which it was originally removed and weeds and other unwanted vegetation are buried to a depth which is sufficient to prevent their re-emergence in nearly every case. The buried vegetation also rots and increases the humus content of the soil. The scrapers 118 not only positively loosen the successive slices of soil from the portions 112 of the tines 111 and the neighbouring plates 105 bus also prevent weeds, root debris and the like from adhering to the tines for any length of time, such adherence tending to have a harmful effect upon the operation of the cultivator or rotary plough. The described and illustrated configuration of the tines 111 tends to facilitate their penetration into the soil even in cases in which very hard soil is being worked. The use of tines for the penetration of the soil tends to reduce smearing of the sub-soil to a minium. It is preferred that the tined rotor 103 should have an overall diameter of not less than 50 and not more than 90 centimeters.

FIGS. 18 to 22 of the drawings illustrate a cultivator, which may also be considered as being a rotary plough, that has a frame 140 which is generally similar to the frame 91 that has been previously described comprising substantially horizontal lower and upper parallel beams 141 and 143 of hollow configuration and, preferably, square cross-section that both extend perpendicular, or at least transverse, to the intended direction of operative travel A. The beams 141 and 143 are interconnected by three vertical, or at least upright, beams 142 and supporting beams 144 and 145 that are shorter than the corresponding previously described supporting beams 95 and 96 project rearwardly from the beam 141 with respect to the direction A at similar locations to said beams 95 and 96. Inclined strengthening beams 146 and a substantially triangular guard plate 147 occupy similar dispositions and serve similar functions to the previously described strengthening beams 97 and guard plate 98. Each of the supporting beams 144 and 145 is provided beneath a region adjacent its rearmost free end with a corresponding cylindrical supporting sleeve 148 (FIGS. 20 and 21) in which a corresponding end of a substantially horizontal shaft 149 is located in such a way that said shaft 149 extends parallel to the beams 141 and 143. Shouldered sleeves 150 and 151 that extend partly into the supporting sleeves 148 surround the shaft 149 at the ends of the two supporting sleeves 148 that are closest to one another. The relatively closest ends of said sleeves 150 and 151 are provided with horizontal bearings 152 whose outer races, in turn, are surrounded by housings 153. The housings 153 are located at the opposite ends of a central tubular support 154 that rotatably surrounds a major portion of the length of the shaft 149.

The bearing housings 153 carry corresponding plates 156 and 157 that are contained in planes extending substantially perpendicular to the longitudinal axis a of the shaft 149. The shapes of the plates 156 and 157 can be seen in FIG. 22 of the drawings in respect of the plate 156. The central tubular support 154 is surrounded between the plates 156 and 157 by a jacket 158 whose cross-sectional configuration can be seen in broken lines in FIG. 22. The jacket 158 comprises two portions 159 and 160 that are substantially diamtrically opposite to one another with respect to the axis a of the shaft 149 and each of them forms part of a corresponding substantially cylindrical sheath whose longitudinal axis is substantially parallel to, said axes being substantially uniformly spaced apart from the longitudinal axis a of the shaft 149. Between the sheath parts 159 and 160, the jacket has portions 161 and 162 that are relatively inclined and that meet at two locations which are substantially diametrically at opposite sides of the axis a of the shaft 149.

Plates 164 are fastened to the plates 156 and 157 by bolts 163, the shape of one of said plates 164 being visible in elevation in FIG. 22 of the drawings. The relatively remote side of the two plates 164 are provided with stiffening ribs 165 and 166, and, near their uppermost and lowermost ends as seen in the drawings, the plates 164 are interconnected by tubular supports 167 that are rotatable with respect to the plates 164 by means of stub shafts 168 and 169 rotatably mounted in ball bearings 170A and 171 (FIG. 21) contained in closed housings 170 and 171A (FIG. 20). The housings which have just been mentioned are secured to the supports 167 whose longitudinal axes $b$ (FIG. 20) also constitute the axes of rotation thereof. It should be noted that the two axes $b$ and the single axis $a$ are all contained in a single plane. Moreover, the axes $b$ also coincide with the centers of curvature of the cylindrical sheaths of which the jacket portions 159 and 160 form corresponding parts. Each of the supports 167 is provided at regular intervals, which may conveniently be substantially 10 centimeters, along its length with tines 172 that are arranged in two rows. The rows of tines 172 extend parallel to the axes $b$ and, although each tine 172 is curved to some extent, it extends substantially perpendicular to the corresponding axis $b$. It can be seen from FIG. 22 of the drawings that the two rows of tines 172 corresponding to each tine support 167 are offset from one another at substantially 180° around the corresponding axis $b$. Each slightly curved tine 172 tapers at a point at its free end or tip and it will be seen from FIG. 22 that the curvature is such as to direct each tine 172 forwardly to a small extent with respect to the intended directions of rotation D of both supports 167 and their tines 172. The radial lengths of the tines 172 are such that their tips pass very close to the cylindrically curved portions 159 and 160 of the jacket 158. It will be seen from FIGS. 20 to 22 of the drawings, which are all to the same scale, that the tines 172 are wider in directions parallel to their planes of rotation at their root ends than they are thick (in directions parallel to the axes b) at the same ends. Each support 167 with the corresponding two rows of tines 172 constitutes a soil working member that is generally indicated by the reference 173, each soil working member being rotatable about the corresponding axis $b$.

A ring 164A is fastened to the plate 157 by the same bolts 163 that interconnect the plates 157 and 164. The ring 164A integrally carries a sprocket wheel 174 at the end of said ring remote from the plates 164 and 157, the sprocket wheel 174 being linked to a further sprocket wheel 176 by a transmission chain 175. The sprocket wheel 176 is carried on a shaft 177 that is journalled in a gear box 178 so as to extend parallel to the shaft 149. The gear box 178 (FIGS. 18 and 19) is fastened to a bracket 179 carried by the frame beam 143. The shaft 177 is provided, inside the gear box 178, with a bevel pinion 180 whose teeth are in driven mesh with those of a further bevel pinion 181 carried by a shaft 182 which has a splined or otherwise keyed portion that projects forwardly from the gear box 178 in substantially the direction A to serve as a rotary input shaft. The sprocket wheels 174 and 176 and the transmission chain 175 are arranged in a protective casing 183. The two sleeves 150 and 151 (FIGS. 20 and 21) are both integrally provided with corresponding sprocket wheels 184 and these sprocket wheels are linked by corresponding transmission chains 185 to sprocket wheels 186 mounted on, or integral with, the two stub shafts 169 at the ends of the two tubular tine supports 167. It will thus be seen that the two tine supports 167 are driven from their ends and that those ends are located at the opposite sides of the cultivator or rotary plough. The two chain and sprocket wheel assemblies 184/186 are surrounded by corresponding protective casings 187 and 187A, said casings extending between projecting rims 188 of the plates 164 and the ring 164A and a corresponding but smaller ring 187B (FIGS. 21 and 22) near the opposite end of the shaft 149 from the ring 164A.

The relatively remote ends of the sleeves 150 and 151 (FIGS. 20 and 21) are formed with steps 189 and these steps are arranged to co-operate with matchingly shaped steps at the inner ends of short sleeves 190 that surround the outermost opposite ends of the shaft 149, said sleeves 190 being secured to the shaft 149 by axial bolts 191. The steps 189 and bolts 191 fix the sleeves 150 and 151 in place relative to the shaft 149 but the construction is such as to be capable of being readily assembled or disassembled when required. Each of the two sleeves 190 carries a corresponding upwardly projecting lever 192 which levers can be employed to turn those sleeves, together with the sleeves 150 and 151 and the shaft 149, about the axis *a* of said shaft. The levers 192 and the parts which have just been mentioned can be retained in any chosen one of a number of different angular settings around the axis *a* by means of spring-loaded substantially horizontal locking pins 193A which those levers carry, the tips of said locking pins 193A being capable of being entered through any chosen ones of curved rows of holes 194 formed in upright strips 195 mounted on top of the supporting beams 144 and 145. Upon turning the levers 192 angularly around the axis *a*, the sprocket wheels 184 are turned with the shaft 149 so that the chains 185 also cause the tine supports 167 to turn about their axes *b*. The shaft 149, the surrounding tubular support 154, the plates 164 and the soil working members 173 together constitute a rotor which, during the operation of the cultivator or rotary plough, can be revolved in the direction B shown in FIG. 19 of the drawings by way of the sprocket wheel 174 and the other transmission parts which have been described. The two soil working members 173 are controlled by the transmission members 184 to 186 inclusive and rotate the tubular supports 167 of those members 173 in the directions D shown in FIG. 19 of the drawings in such a way that, at any given angular position of the whole rotor around the axis *a*, the two soil working members 173 will occupy specific corresponding angular positions about the two axes *b*. The arrangement is, in fact, such that, when one of the coil working members 173 is in a lowermost position as shown in FIG. 19 of the drawings, one of its rows of tines 172 will be disposed with the points thereof projecting forwardly in substantially the direction A. A transmission ratio of 1 to 2 exists between the sprocket wheels 184 and 186 so that each soil working member 173 turns about the corresponding axis *b* through 180° while the whole rotor revolves through 360°. The protective casings 187 and 187A afford, together with the registering portions of the two plates 164, supporting arms for the soil working members 173, said arms housing the control mechanisms that comprise the transmissions 184/186.

The front of the frame 140 has a generally triangular coupling member or trestle 210 rigidly secured to it to enable the cultivator or rotary plough to be connected to the free ends of the lifting links of a three-point lifting device or hitch carried by an agricultural tractor or other operating vehicle in the manner which can be seen in outline in FIGS. 18 and 19 of the drawings. As in the previously described embodiment, the coupling member or trestle 210 is located at one lateral side of the cultivator or rotary plough with respect to the direction A so that, during operation, a strip of land will be worked that is offset to one side of, but in overlapping relationship with, the path of travel of the operating tractor or other vehicle. It will be noted from FIG. 19 of the drawings that the lower connection points of the coupling member or trestle 210 are located in front of the upright frame beams 142 with respect to the direction A and that the single upper connection point is at a higher horizontal level then the upper substantially horizontal frame beam 143. Holders 196 for upwardly and downwardly adjustable coulters 197 are provided in the corners between the beams 141 and 144 and 141 and 145 respectively.

In the use of the cultivator or rotary plough that has been described with reference to FIGS. 18 to 22 of the drawings, its coupling member or trestle 210 is connected to the three-point lifting device or hitch of an agricultural tractor or other operating vehicle in the manner that can be seen in outline in FIGS. 18 and 19 of the drawings and the forwardly projecting end of the shaft 182 is placed in driven connection with the power take-off shaft of the same tractor or other operating vehicle by way of an intermediate telescopic transmission shaft 198 of a construction that is known per se having universal joints at its opposite ends. As the cultivator or rotary plough is moved over the soil in the direction A, the rotary drive that is imparted to the shaft 182 causes the whole rotor 300 to revolve in the direction B shown in FIG. 19 of the drawings and the soil working members 173 to rotate simultaneously in the directions D around the corresponding axes *b*. It is preferred that the rotor should rotate at a speed of between substantially 150 and substantially 200 revolutions per minute, the transmission being so arranged that, as previously mentioned, the tines 172 of one row are pointing forwardly in substantially the direction A as they pass through the soil when the corresponding member 173 is at substantially the lowermost point of its path of bodily rotation around the axis *a*.

FIGS. 23 to 26 inclusive of the accompanying drawings illustrate four different angular dispositions of one of the soil working members 173 around the axis a of the shaft 149. It will be remembered that, while rotor 300 is being bodily displaced around the axis *a*, each soil working member 173 is simultaneously rotating in the direction D around the corresponding axis *b* and FIGS. 23 to 26 of the drawings show the relationship of one row of tines 172, constituting active or soil working portions of the corresponding member 173, to a slice of earth. FIG. 23 illustrates the condition in which the row of tines 172 first penetrate into the ground surface to loosen the slice from the surrounding soil, the width of said slice substantially corresponding to the perpendicular distance between the coulters 197 (see FIG. 18). As the member 173 moves onwardly towards the position shown in FIG. 24 of the drawings, the slice is fully loosened from the surrounding soil and is supported from beneath by the row of tines 172, said tines then pointing forwardly in substantially the direction A. The other row of tines 172 of the same soil working member point substantially rearwardly with respect to the direction A at the same instant. During the movement of the soil working member 173 from the position shown in FIG. 23 to that shown in FIG. 24, the surrounding substantially undisplaced soil tends to scrape off any dirt, root debris and the like that may be adhering to the row of tines 172 that, at such time, are pointing generally rearwards with respect to the directions A and B. The rows of tines 172, which are successively operative and inoperative, are thus substantially self-cleaning during their inoperative periods.

Once the soil working member 173 under consideration has reached the position around the axis *a* of the shaft 149 that is shown in FIG. 25 of the drawings, the slice of soil has been lifted completely clear of the undisplaced earth and it will be realised that, at this time, one of the rows of tines 172 of the other soil working member 173 occupies the position shown in FIG. 23 of the drawings and is commencing to loosen a further slice of soil. When the soil working member 173 under consideration reaches the position shown in FIG.

26 of the drawings at which its axis of rotation $b$ is substantially vertically above the axis of rotation $a$ of the whole rotor, gravity starts to cause the supported slice of soil to fall downwardly along the tines 172 and onto the inclined portion 161 of the jacket 158. The freed slice of soil falls back into the excavated furrow in a substantially inverted condition, a further slice of soil having been displaced from the ground by one of the rows of tines 172 of the other member 173 by the time that the slice under consideration has fallen back into the furrow. It will be realised that, while the soil working member 173 under discussion occupies the position shown in FIG. 26 of the drawings, the other soil working member 173 will be in the position shown in FIG. 24 of the drawings.

In the use of the cultivator or rotary plough of FIGS. 18 to 22 of the drawings, the active or soil working portions of the soil working members 173 that are afforded by their tines 172 gradually loosen successive slices of soil in a regular manner and displace those slices upwardly and rearwardly over the axis $a$ with respect to the direction A. Inversion of each slice is involved in this displacement and the inverted slices fall back to the bottom of the excavated furrow in a substantially inverted condition. The two rows of tines 172 of each soil working member 173 are alternately active and inactive and, as has been discussed above, the surrounding substantially undisplaced soil co-operates with the tines 172 that are trailing and inactive to scrape those tines substantially clear of adhering dirt, root debris and the like. When each soil working member 173 is at substantially its lowermost position around the axis $a$ (FIGS. 22 and 24), the two rows of tines 172 that project in opposite directions with respect to the corresponding axis $b$ are pointing respectively forwardly and rearwardly with reference to the direction A.

The cultivator or rotary harrow may have to work with soils having differing degrees of hardness and differing moisture contents and the optimum angle of attack of the tines 172 to loosen a slice of soil varies in consequence. For example, a different angle of attack is desireable when the soil has a hard crust as compared with that required when the soil is in a soft and wet condition. The angle of attack of the tines 172 to penetrate into and loosen the successive slices of soil can be changed by turning the levers 192 around the axis $a$. As previously described, such adjusting movements of the levers 192 turn the tine supports 167 about the axes $b$ with a consequent increase or decrease in the angle of attack of the tines 172 in the position shown in FIG. 23 of the drawings. The instant of loosening of each slice of soil can thus be advanced or delayed in relation to the angular position of the corresponding soil working member 173 around the axis $a$. It should be noted that the curved surfaces that are afforded by the parts 159 and 160 of the jacket 158 act as scraping or shedding surfaces during operation of the cultivator or rotary plough and tend to free the points of the tines 172 from any adhering soil, root debris or the like.

FIGS. 27 and 28 of the drawings illustrate a tine construction and mounting that could be used in, for example, the soil working members 173 that have been described with respect to FIGS. 18 to 22 of the drawings. FIGS. 27 and 28 of the drawings illustrate tines 198 that are made in integral pairs, each pair having a shallow S-like configuration when seen in side elevation (FIG. 28). The tines have active or soil working portions 205 that are located at opposite ends of a single fastening portion 200, said portion 200 being of a polygonal, and preferably square, cross-section. The tines 198 are carried by a rotary support 204 which comprises two matching portions 203 that fit together to give the support 204 a substantially oval cross-section (FIG. 28). The tines 198 are entered through holes formed in the junction edges of the two support portions 203 and are maintained in their appointed positions by transverse bolts 201, provided with corresponding nuts, the heads of the bolts 201 and their co-operating nuts being received in depressions 202 in the support portions 203 and the shanks of said bolts being entered through transverse bores in the tine fastening portions 200 that are formed midway along the lengths of those portions. Once the bolts 201 are tightened, the tines 198 are retained firmly in their appointed positions and cannot turn about the axes of the common fastening portions 200. The two support portions 203, one of which is detachable from the other, (i.e. the left-hand portion as seen in FIG. 28 of the drawings) are also firmly clamped to one another once the bolts 201 are tightened. The arrangement of the heads of the bolts 201 and their co-operating nuts in the depressions 202 prevents them from projecting to any appreciable extent so that there is a reduced tendency for root debris and the like to adhere to them. The active or soil working portions 205 of the tines 198 are also of a polygonal, and preferably rectangular, crosssection throughout their lengths, said portions tapering toward their free ends or tips. With the rectangular, in cross-section, construction of each portion 205 that is illustrated, each of the four sides of each portion 205 is formed with four concave or at least hollow grooves or recesses 199 throughout substantially the whole of its length. The soil working portions 205 of the tines 198 are flattened to some extent towards their free ends or tips so that, with the rectangular cross-sectional configuration that is illustrated, a diagonal between two opposite corners (in cross-section) taken at a point near the tip of each portion 205 has a different magnitude to a diagonal taken between the opposite two corners at the same point. The arrangement is such that the longer diagonal extends substantially parallel to the axis of rotation of the support 204 which axis corresponds to one of the axes $b$ in the preceding embodiment.

The curvatures of the soil working portions 205 of the tines 198 are such that the free ends or tips thereof are directed forwardly with respect to the intended direction of rotation D (FIG. 28). The curvature of each portion 205 is uniform and the construction and arrangement of the tines is such as to provide very good penetration of those tines into the soil particularly when working under adverse conditions in which heavy and wet soil is met with. Under such conditions, the successive slices of soil are readily loosened and the slices are effectively supported from beneath by the concave or hollow sides of the curved tines during lifting of the slices from the surrounding undisplaced soil.

Although various features of the soil cultivating implements, cultivators, harrows or rotary ploughs that have been described and/or illustrated in the accompanying drawings will be set forth in the following claims as inventive features, it is emphasised that the invention is not necessarily limited to those features and that it includes within its scope each part of each implement, harrow, cultivator or rotary plough that has been described and/or illustrated both individually and in various combinations.

What we claim is:

1. A rotary plow implement attachment for connection to a prime mover, said attachment having at least one rotor and drive means connected to said rotor to revolve same about a substantially horizontal axis, said drive means including an imput shaft connectable to a power take off and said rotor comprising a plurality of tines, said tines each having an elongated active soil working portion which extends substantially tangentially with respect to a circle centered on the axis of rotation of said rotor, said tines extending in V-shaped row relationship and the point of each V-shaped row being directed forwardly with respect to the normal direction of rotation of said rotor to penetrate the soil first, said tines having outer soil engaging means that are substantially flattened in generally horizontal planes, said tines being positioned adjacent one another to act in unison on the ground to cut free slices of soil across the width of said rotor and for lifting the free slices of soil upwardly.

2. An implement as claimed in claim 1, wherein there are three V-shaped rows on said rotor and said rows are angularly offset from one another at substantially 120° intervals around the axis of rotation of said rotor.

3. An implement as claimed in claim 1, wherein there are a plurality of scrapers on said rotor that extend radially inwardly with respect to said tines, said scrapers being positioned to displace slices of soil being lifted by the tines during rotation of said rotor.

4. An implement as claimed in claim 3, wherein a plurality of further scrapers are provided to the rear of said soil working members, said further scrapers extending upwardly and forwardly with respect to the direction of travel of the implement from their fastening points and being located at a lower horizontal level than said first mentioned scrapers.

5. An implement as claimed in claim 1, wherein each of said tines is pointed rearwardly with respect to the normal direction of travel when the respective tine is in its lowermost position during rotation of said rotor.

6. An implement as claimed in claim 1, wherein said tines are mounted on elongated supports in said V-shaped relationship rows, said supports forming parts of said rotor.

7. An implement as claimed in claim 1, wherein the said tines have fastening portions which are inserted in holders on a support of said rotor.

8. An implement as claimed in claim 1, wherein said drive means includes a variable change speed transmission.

9. An implement as claimed in claim 1, wherein said tines are mounted on at least one support member that is spaced from the axis of rotation of said rotor.

10. An implement as claimed in claim 1, wherein said tines extend substantially parallel to one another.

11. An implement as claimed in claim 1, wherein the active soil working portions of said tines are straight.

12. An implement as claimed in claim 1, wherein said tines are mounted on at least one turnable support member and the active soil working portions of said tines extend substantially tangentially with respect to circles centered upon the axis of rotation of said support member.

13. An implement as claimed in claim 12, wherein the active soil working portions of the tines are of angular or polygonal cross-section and are formed with concave or hollow grooves in their otherwise flat sides, said grooves extending lengthwise of said soil working portions.

14. An implement as claimed in claim 13, wherein said grooves extend throughout substantially the whole length of each active soil working portion.

15. An implement as claimed in claim 13, wherein said active soil working portions are flattened towards their ends whereby, diagonals taken between opposite corners, thereof, as seen in cross-section, adjacent said ends are of different length, the longer diagonals extending substantially parallel to the axis of rotation of said support member.

16. An implement as claimed in claim 12, wherein said tines have threaded fastening portions that fit in said holders and said tines being secured to said support member with nuts tightened on said fastening portions.

* * * * *